Dec. 21, 1954　　　W. L. SHEPPARD　　　2,697,363
TRANSMISSION CONTROL SYSTEM
Filed June 11, 1949　　　6 Sheets-Sheet 1

INVENTOR.
William L. Sheppard.
BY
Harness and Harris
ATTORNEYS.

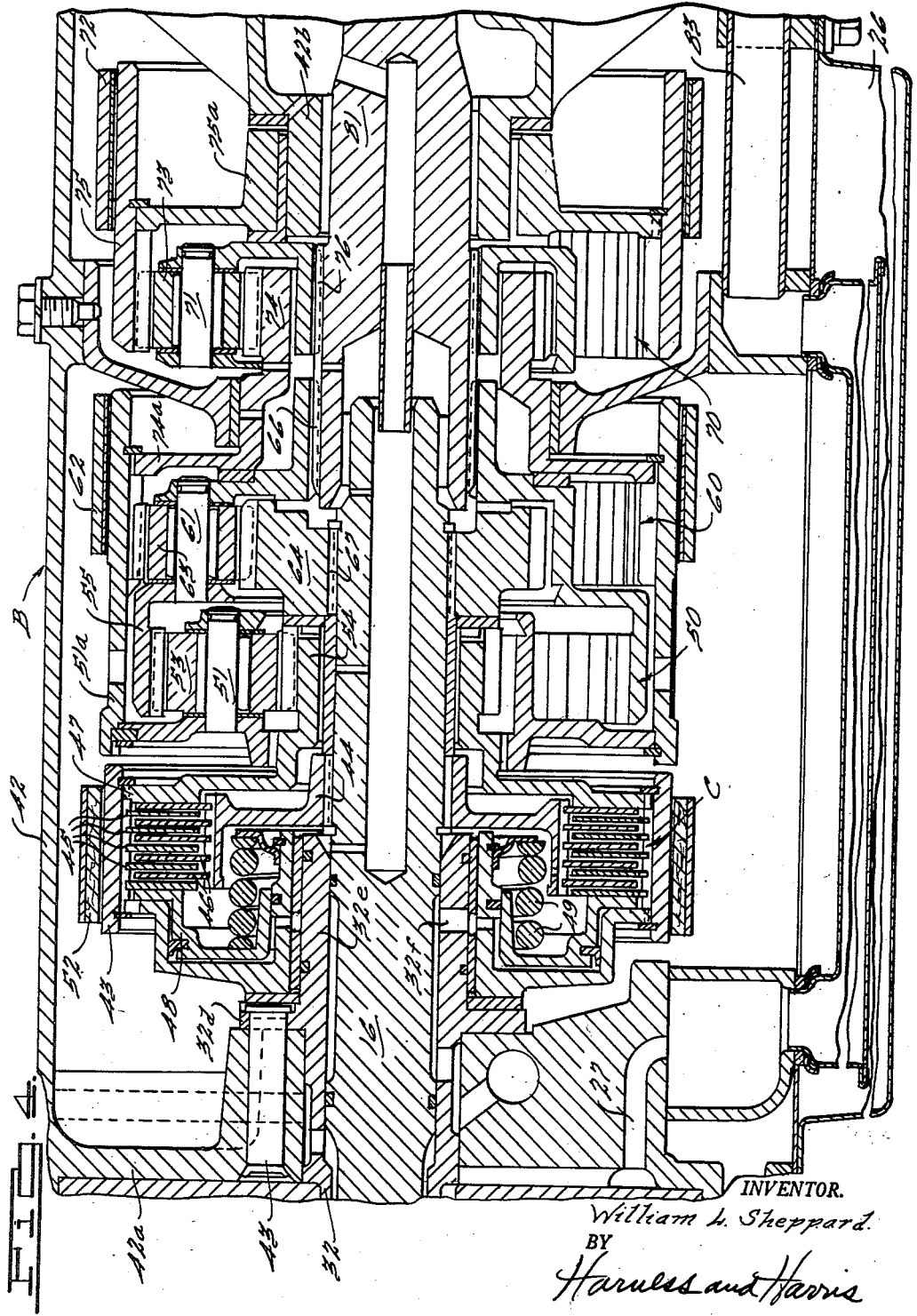

Dec. 21, 1954  W. L. SHEPPARD  2,697,363
TRANSMISSION CONTROL SYSTEM
Filed June 11, 1949  6 Sheets-Sheet 3
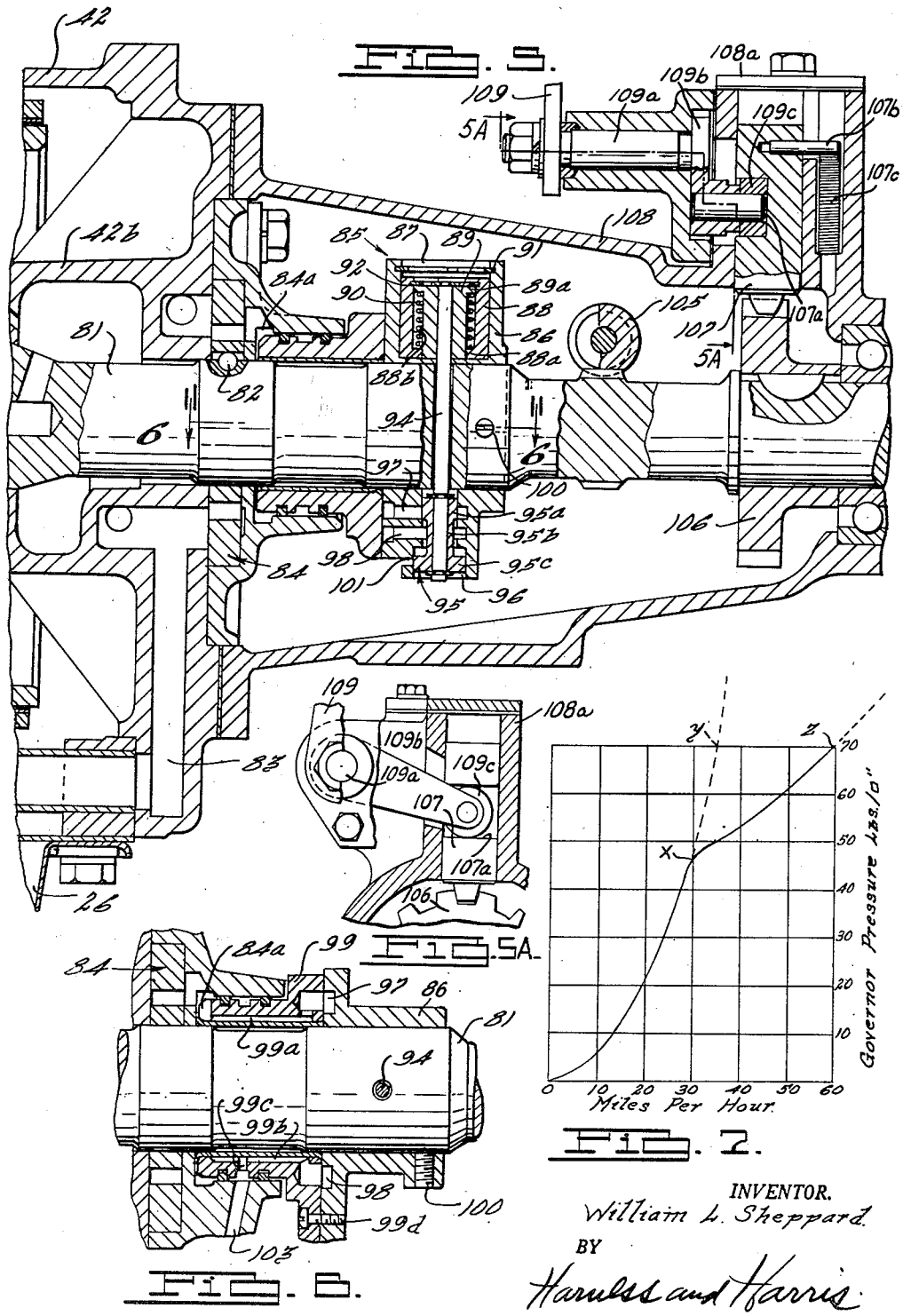
INVENTOR.
William L. Sheppard
BY
Harness and Harris
ATTORNEYS Dec. 21, 1954
W. L. SHEPPARD
2,697,363
TRANSMISSION CONTROL SYSTEM
Filed June 11, 1949
6 Sheets-Sheet 4
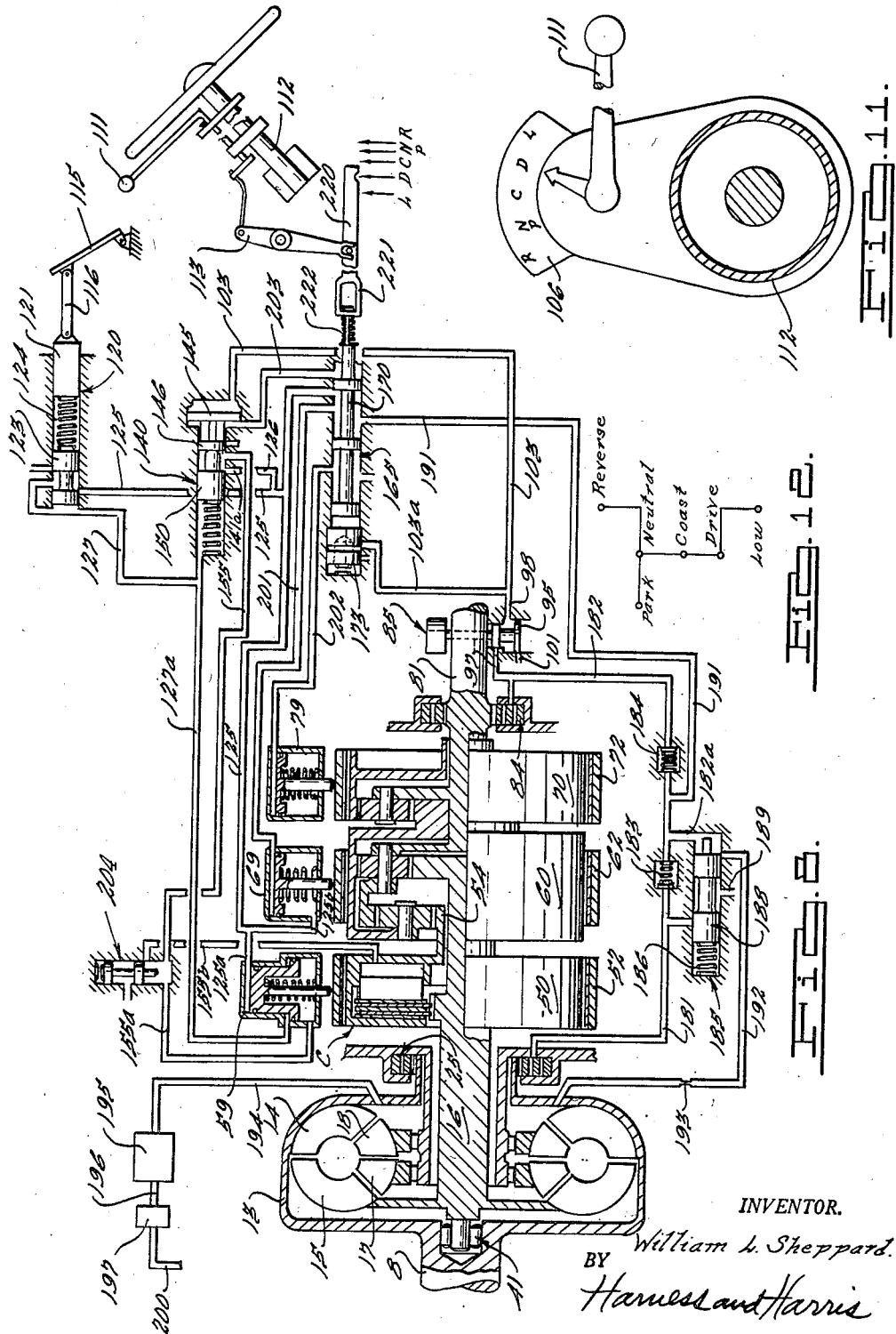
INVENTOR.
William L. Sheppard.
BY
Harness and Harris
ATTORNEYS.

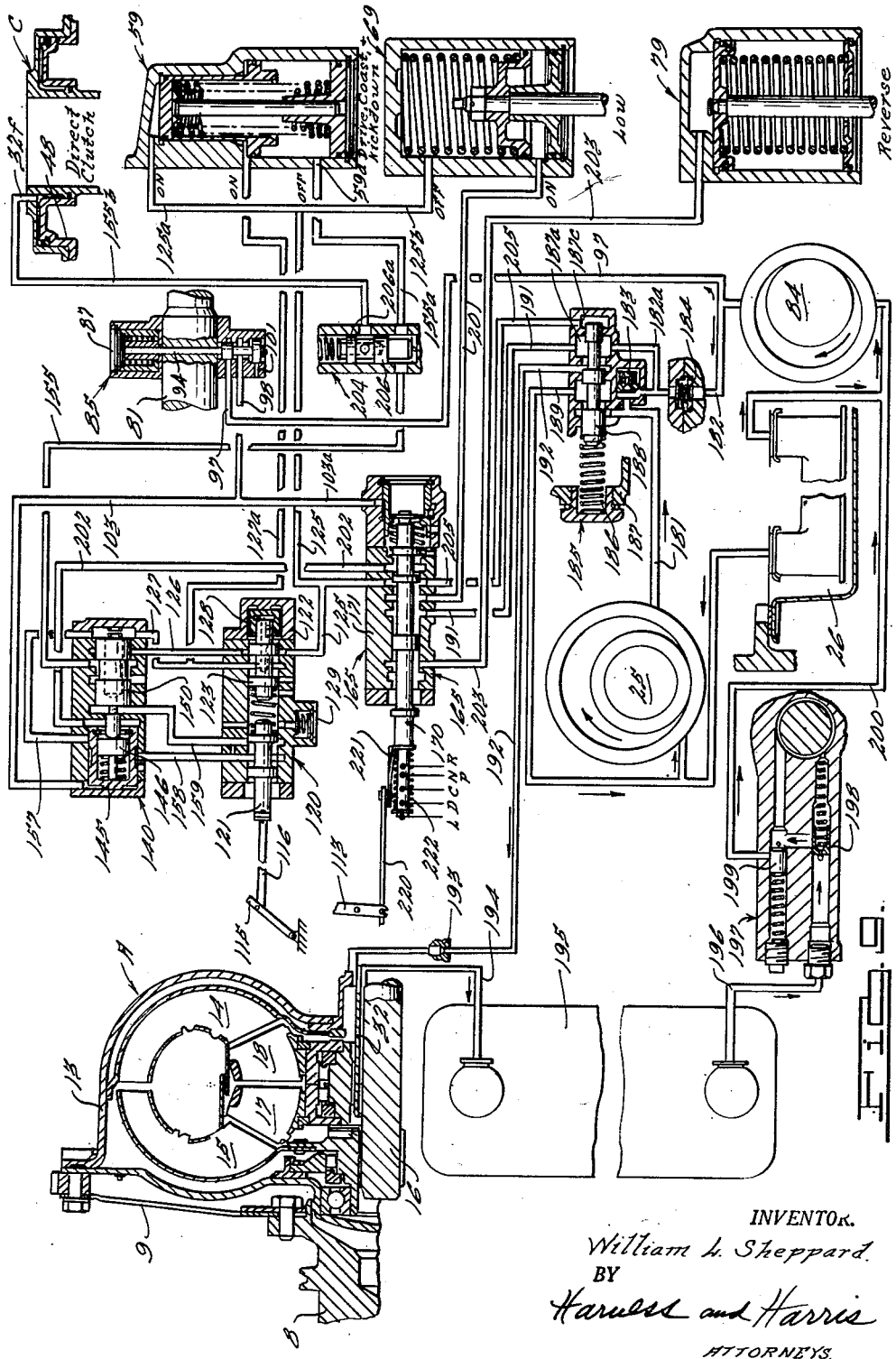

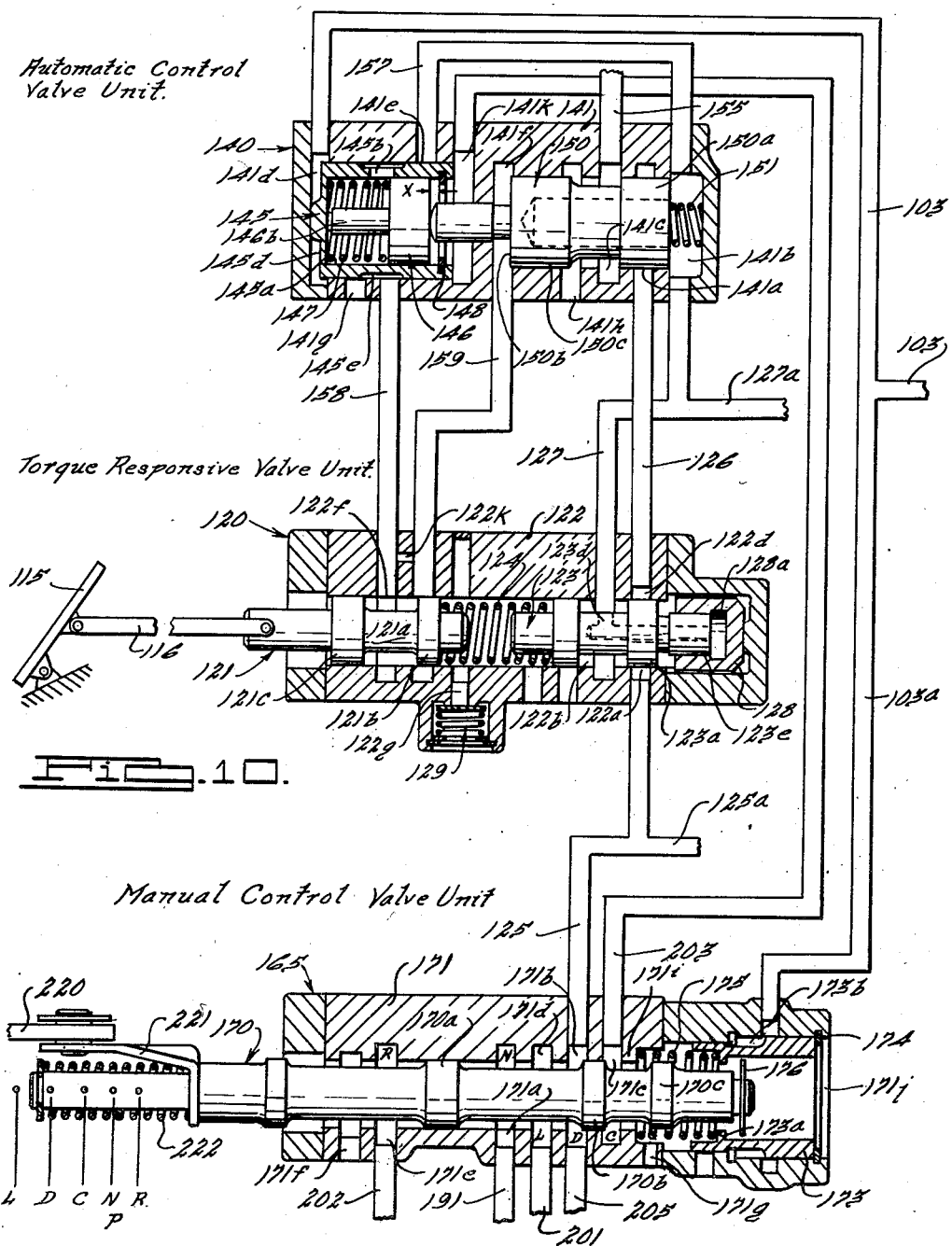

United States Patent Office 2,697,363
Patented Dec. 21, 1954

2,697,363

TRANSMISSION CONTROL SYSTEM

William L. Sheppard, Romulus, Mich., assignor to Chrysler Corporation, Highland Park, Mich., a corporation of Delaware Application June 11, 1949, Serial No. 98,493

38 Claims. (Cl. 74—472)

This invention relates to a change speed power transmission unit and particularly to the control system for such a unit whereby automatic upshifts and downshifts in the speed ratio drives transmittable thereby may be smoothly and efficiently accomplished.

It is a primary object of this invention to provide a completely hydraulic control system for a change speed transmission or the like which system automatically accomplishes the upshifts and downshifts in speed ratio drive in accordance with the variable relationships existing between the speed and torque loads applied to the transmission unit.

It is a further object of this invention to provide an improved, simplified form of hydraulic control system that is characterized by extreme flexibility and efficient, accurate operation.

It is another object of this invention to provide an improved type of governor mechanism that will permit ready modification and control of its operability characteristics so as to provide the flexibility necessary in an automatic motor vehicle transmission or the like.

It is an additional object of this invention to provide an improved type of automatic control valve that will accurately coordinate variable speed and torque responsive pressures and positively apply the resultants thereof to effect speed ratio changes at the most advantageous times.

It is another object of this invention to provide an improved type of torque responsive control unit adapted to manually initiate changes in the speed ratio drives transmittable by a transmission unit.

It is a further object of this invention to provide novel means for limiting the manually and automatically effected changes in speed ratio drive transmittable by a transmission unit.

It is still another object of this invention to provide means to coordinate the action of a hydraulically operated speed responsive device and a hydraulically operated torque responsive device such that a change speed transmission unit may be efficiently and accurately controlled thereby.

Other objects and advantages of this transmission control system will be readily apparent from a reading of the following description and a consideration of the related drawings wherein:

Fig. 4 is a sectional elevation of the gear box associated with this transmission, portions of the box being broken away;

Fig. 5 is a sectional elevation of the mechanism mounted on and located within the tailshaft housing at the rear end of the gear box;

Fig. 5A is a sectional elevational view taken along the line 5A—5A of Fig. 5 showing the operating mechanism for the parking sprag;

Fig. 6 is a fragmentary sectional elevation of the governor mechanism mounted on the transmission tailshaft, the section being taken along the line 6—6 of Fig. 5;

Fig. 7 is a pressure speed curve for the governor mechanism shown in Figs. 5 and 6;

Fig. 8 is a diagrammatic view of the transmission unit and the complete control system therefor, the controls and valving associated therewith being shown as set for Drive with the speed and torque conditions such that the upshift to direct drive has been accomplished;

Fig. 9 is a diagrammatic view of the complete hydraulic control system for this transmission unit with certain of the components thereof being shown in section. The components are shown set for Drive with the accelerator pedal in closed throttle position;

Fig. 10 is an enlarged fragmentary sectional elevation of a portion of the control valving shown in Fig. 9;

Fig. 11 is a plan view of the control segment and drive selector lever employed with this transmission, portions thereof being shown in section; and Fig. 12 is a diagrammatic view of the control lever shift pattern for this transmission.

Figure 1:
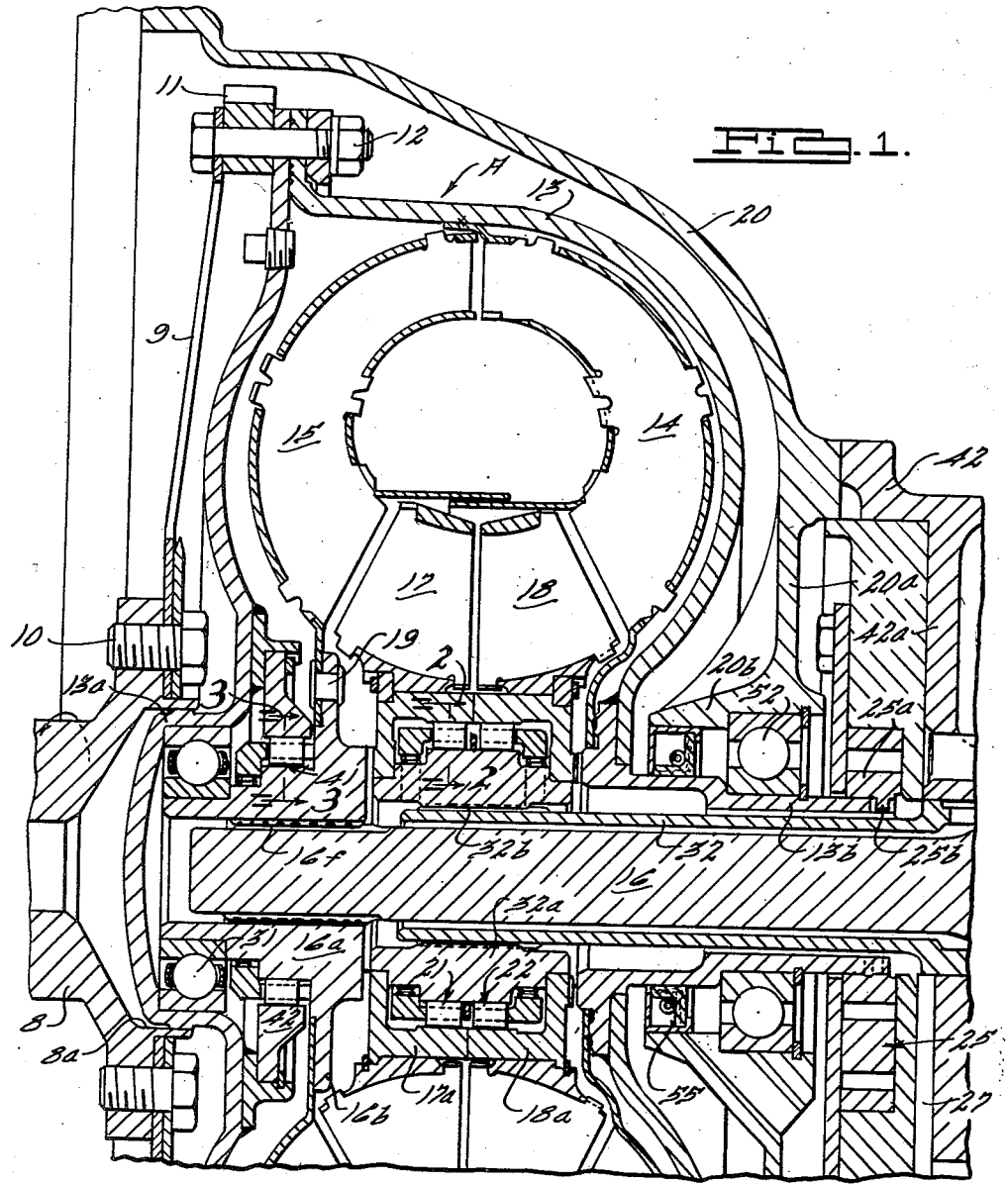
Fig. 1 is a partial sectional elevation of the hydrokinetic torque converter unit employed with this transmission.

Fig. 1 of the drawings discloses the hydrokinetic torque converter unit A employed with this transmission unit. Converter unit A is adapted to drivingly connect a prime mover such as a motor vehicle engine to a driven member such as the transmission input shaft of a gear type transmission unit. The reference numeral 8 represents an end portion of a driving member, such as the engine crankshaft of a motor vehicle power unit. The shaft 8 is drivingly connected to the axially flexible drive transmitting plate 9 by the screw means 10. The drive transmitting plate 9 has an engine starter ring gear 11 mounted on its periphery by the bolt and nut means 12. Also drivingly connected to the drive plate 9 by the bolt and nut means 12 is the torque converter casing 13 within which are mounted the various converter components, namely, the impeller member 14, the turbine or runner member 15, and the guide wheel or reaction members 17 and 18 respectively.

The vaned impeller wheel 14 is fixedly connected to the converter casing 13 and is accordingly adapted to be rotatably driven by the driving shaft 8. The vaned turbine wheel 15 is drivingly conected by rivet means 19 to a radially extending flange portion 16b formed on the hub member 16a that is connected by splines 16f to the forward end portion of the driven intermediate shaft member 16.

The intermediate shaft member 16 is adapted to transmit drive from the torque converter unit A to the planetary gear unit B arranged rearwardly of and in series with the torque converter unit A. The forward end of intermediate shaft 16 is piloted in the axially extending annular seat 13a formed in the converter casing 13. A ball bearing assembly 31 rotatably supports the forward end of intermediate shaft 16 in the converter housing seat 13a. The rear end portion of intermediate shaft 16 is rotatably supported by the sleeve-type bearing 32 which is mounted in the housing 42 of gear unit B in a manner hereinafter more fully described.

Figure 2:
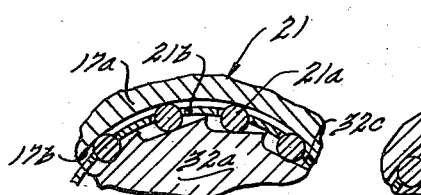
Fig. 2 is a fragmentary sectional elevation of a portion of the torque converter unit, the section being taken along the line 2—2 of Fig. 1.

The vaned guide wheel 17 is rotatably supported within the converter casing 13 by means of the guide wheel hub portion 17a that is rotatably mounted, by means of a one-way brake device 21, on the axially extending sleeve 32 that is fixed to and projects from the rearwardly positioned, relatively stationary, gear box housing 42. Sleeve 32 has a hub member 32a splined thereto at 32b which hub member supports the overrunning or one-way brake device 21. As clearly shown in Fig. 2, the one-way brake device 21 comprises rollers 21a mounted within a cage member 21b. The cage member 21b is normally urged into drive transmitting position by means of a tension spring or the like. Cam surfaces 32c, formed on the outer peripheral surface of the sleeve hub member 32a, cooperate with the brake rollers 21a and the outer roller race formed by the bore 17b through the guide wheel hub member 17a. It is thought to be obvious from Fig. 2 that the one-way brake 21 will permit only forward rotary movement (clockwise when looking in the direction of arrows 2—2 of Fig. 1) to be transmitted to guide wheel 17 by the forward rotation of the impeller 14, the brake 21 preventing rotation of the guide wheel 17 in a reverse or counterclockwise direction.

The secondary guide wheel 18 is rotatably mounted on sleeve hub member 32a by means of the hub portion 18a and the overrunning or one-way brake device 22. The one-way brake device 22 is similar in design and operation to the brake device 21, shown in Fig. 2. The brake device 22 is arranged to prevent rotation of guide wheel 18 in a counterclockwise direction when looking from the forward or driving end of the power transmitting unit in the direction of arrow 2—2 of Fig. 1.

Figure 3:
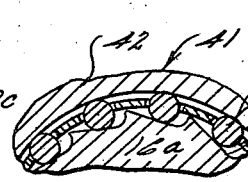
Fig. 3 is another fragmentary sectional elevation of another portion of the torque converter unit, this section being taken along the line 3—3 of Fig. 1.

An overrunning or one-way clutch device 41 is mounted between the hub portion 16a of driven intermediate shaft 16 and the encircling annular ring 42 that is fixedly mounted to the inner wall of the converter housing 13. This one-way clutch device 41 is similar to the one-way brakes 21 and 22 but reversely arranged so as to prevent the speed of the driving shaft 8 from dropping below the speed of the driven shaft 16. Such an arrangement is quite advantageous due to the fact that it provides a means for obtaining engine braking in an engine driven power transmitting device having a slip characteristic. Without some positive lock-up means between the intermediate driven shaft 16 and the driving shaft 8, on coast drive, slip might occur in the torque converter unit A that would tend to nullify the braking effect of the power unit drivingly connected to the driving shaft 8. The clutch device 41 has particular importance in motor vehicle drive for not only does it provide a means for obtaining engine braking on coast drive, but it also provides a means for automatically locking the intermediate driven shaft 16 to the driving shaft 8 to facilitate starting of the engine unit (not shown) by towing or the like. The overrunning or one-way clutch device 41, see Fig. 3, while similar in design to the one-way brake device 21 shown in Fig. 2, has the cams 16g on the driven shaft hub portion 16a that cooperate with the rollers 41a of the clutch device 41, slanted in a direction opposite to that of the cam surfaces 32c. Such an arrangement insures lock-up of the clutch device 41 when the intermediate driven shaft 16 drives the driving shaft 8 in a forward or clockwise direction (looking in the direction of the arrows 3—3 of Fig. 1).

The torque converter unit A includes a gear type oil pump 25 having a driven gear 25a that is directly connected by pin means 25b to the axially extending flange portion 13b of the rotatable converter casing 13. The pump 25 draws oil from a sump 26 (see Fig. 4) through the conduit 27 and circulates it through the converter unit A, the transmission lubricating system and the various hydraulically operated control mechanisms associated with this transmission unit (see Figs. 8 and 9). The circulation of oil through the converter A, by the pump 25, provides a means for maintaining the converter full of oil whenever shaft 8 is rotating. Furthermore, this circulation of the working fluid through the converter and the lubricating and hydraulically operated control systems provides a means for cooling the converter fluid. A second oil pump 84 driven by the transmission output shaft 81 is also included in this transmission to provide a source of pressure fluid when the engine is not operating. The pump 84 and its operation will be more fully described in connection with the planetary gear box B.

The relatively stationary outer housing 20 for the hydraulic converter unit A has a rear wall portion 20a from which there projects in a forwardly directed, axially extending direction, a sleeve-like flange portion 20b. Fixedly mounted in the housing flange 20b by means of a snap ring is a ball bearing assembly 52. Bearing assembly 52 rotatably supports the axially extending flange portion 13b of the torque converter casing 13. The forward portion 13a of torque converter casing is piloted in the bore 8a of the driving shaft member 8 so that portions of the casing 13 may shift axially to compensate for the breathing tendencies of the casing 13. This rotatable mounting of the casing is completely described in the copending application of Augustin J. Syrovy, Serial No. 77,939, filed February 23, 1949, now U. S. Patent 2,588,668, dated March 11, 1952.

The gear box B includes the planetary gear trains 50, 60, and 70 respectively and the forward direct drive clutch mechanism C. The gear box housing 42 includes a forward wall portion 42a to which is connected by pin means 43 a radially extending flange 32d of the axially extending hollow sleeve member 32. The rear portion 32e of sleeve 32 provides a journal support for the driven portion 43 of the direct drive clutch C. The remaining portions of the direct drive clutch C, as well as the several gear trains 50, 60 and 70, are concentrically arranged about the coaxially disposed driven shafts 16 and 81 in a manner to be subsequently described.

The forward gear train 50 and the intermediate gear train 60 cooperate with the torque converted unit A to provide a means for obtaining a combination fluid and mechanical, high torque multiplication, low speed, underdrive particularly adapted for the accelerating starting drive of a motor vehicle. Operating as an independent unit the intermediate gear train 60 provides a coasting gear ratio adapted for engine braking purposes and for use as an emergency low speed underdrive. The rear gear train 70 cooperates with the intermediate gear train 60 to provide a means for transmitting a reverse drive through the transmission. Forward direct drive is obtained by engaging the clutch C which locks up planetaries 50 and 60 and directly connects intermediate driven shaft 16 to output shaft 81 through the carrier member 61 of gear train 60.

The direct drive clutch C includes in addition to drum 43 the annular member 44 which is splined to the intermediate driven shaft 16. Mounted on the peripheral portion of the annular member 44 are friction clutch elements 46. Clutch elements 46 are adapted to be engaged with cooperating clutch elements 45 carried by the drum-shaped member 43. Drum 43 is drivingly connected to the sun gear 54 of the forward planetary gear train 50 by the web 47 carried by drum 43. Engagement of clutch elements 45 and 46 is effected through a hydraulically actuated piston member 48. Compression spring 49 normally urges piston 48 into a disengaged clutch position. Passage 32f in sleeve 32 provides a means for supplying pressure fluid to the piston 48.

Forward planetary gear train 50 includes the planet pinion carrier 51 which is formed with an axially extending peripheral drum portion 51a adapted to be engaged by the braking band 62 of the intermediate gear train 60 as will be presently explained. Rotatably mounted on carrier 51 are a plurality of planet pinions 53 only one of which is shown in section. The teeth of pinions 53 drivingly mesh with the external teeth of the sun gear member 54. Sun gear member 54 is adapted to be anchored against rotational movement by the application of braking band 52 to the direct drive clutch drum 43 which drum is drivingly connected to sun gear 54 by web 47 as already described. The teeth of pinions 53 are also in meshing engagement with the internal teeth on the drum-like extension 55 of the planet carrier 61 of the intermediate gear train 60. Drum 55 constitutes the annulus gear of the forward planetary gear train 50. The drum member 55, while forming a part of the forward planetary gear train 50 is supported by and also forms a part of the planet carrier 61 of the intermediate planetary gear train 60, thus a means is provided for transmitting a forward underdrive through the combined forward and intermediate planetary trains 50 and 60 respectively.

Intermediately planetary gear train 60 includes the planet pinion carrier 61 which is splined to and supported by the output shaft 81 as indicated at 66. Planet pinions 63, rotatably mounted on carrier 61, have teeth meshingly engaged with internal teeth on the rearwardly projecting drum portion 51a of planet carrier 51 of the forward planetary gear train 50. This internally toothed portion 51a of member 51 forms the annulus gear of the intermediate planetary gear train 60. The teeth of pinions 63 also engage external teeth on the sun gear 64 which is splined to the intermediate driven shaft 16 as indicated at 67. Braking band 62 is adapted to be applied to the drum member 51a to anchor the annulus gear of the intermediate gear train 60 against rotation.

Rear planetary gear train 70 includes the drum-like annulus member 75 which is rotatably supported by hub 75a on the axially extending wall portion 42b of the gear box housing 42. Annulus member 75 is adapted to be anchored against rotation by the application of the braking band 72. Annulus member 75 carries internal teeth adapted to mesh with the teeth of the planet pinions 73. Planet pinions 73 are rotatably mounted on the pinion carrier 71 which is splined to the output shaft 81 as indicated at 76. The teeth of planet pinions 73 are also in meshing engagement with the sun gear 74 of gear train 70. Sun gear 74 is drivingly connected by radially extending web portion 74a to the annulus member 51a of the intermediate planetary gear train 60 which member in turn is connected to the carrier 51 of the forward planetary gear train 50. Due to this interconnection between the several planetary gear trains, drive from sun gear 64 of the intermediate train 60 may be transmitted through each of the three trains 50, 60 and 70 respectively of the planetary unit B.

It will be noted that the input drive to any of the planetary gear trains 50, 60 and 70, whether considered singly or in their compounded relationship, is always through the driven sun gear member 64 which member is splined at 67 to the intermediate driven shaft 16. Drive from sun gear 64 through the various planetary gear trains to the output shaft 45 is controlled by the application of the several braking bands 52, 62 and 72 for the planetary gear trains and the condition of direct drive clutch C. During the operation of this transmission at no time is there more than one braking band applied. The control system for operation of the braking bands and the direct clutch is so arranged that when any one band is applied the other bands are released and as one band is released another is applied, consequently the transition from one gear ratio to another is smooth and unnoticed by the operator. When the clutch C is engaged all braking bands are released. The gear box arrangement is similar to that shown in the U. S. patent to Stromquist et al., 2,127,655 and to that shown in the application of Teno Iavelli, Serial No. 25,873, filed May 8, 1948, now U. S. Patent 2,551,746, dated May 8, 1951. The invention disclosed and claimed in this application relates primarily to the control system for this transmission.

Drivingly connected to the output shaft 81 (see Figs. 5 and 6) by the pin 82 is a second gear type oil pump 84. Oil pump 84 is arranged to draw fluid from the oil sump 26 through intake conduit 83 and circulate this fluid through the torque converter A and the hydraulically operated control and lubrication systems of the transmission unit whenever the output shaft 81 is rotating above a certain speed. Consequently, pump 84 provides pressure fluid for operation of the transmission unit during a pushed or towed start even if engine driven pump 25 is inoperative due to a dead engine or the like. Suitable controls, such as the arrangements shown in Figs. 8, 9 and 10 and subsequently described in detail, are provided to have pump 84 automatically take over the supply of pressure fluid for the transmission unit whenever the speed of output shaft 81 exceeds a certain predetermined value. This relieves the engine of a part of the load of front pump 25 after the engine unit has begun to drive the transmission output shaft 81.

Also drivingly mounted on the output shaft 81 (see Figs. 5 and 6) is a speed responsive, centrifugal force operated governor mechanism 85 which provides one of the means for automatically controlling operation of this transmission unit. It is obvious that various types of speed and torque responsive controls may be used with this transmission but the specific governor mechanism 85 herein disclosed is particularly advantageous due to its simplified design and novel manner of operation. This governor unit does not require shaft driven gearing or electrically operated control units but instead uses hydraulic pressure supplied by the rear pump 84 in combination with the centrifugal force effect of a pair of output shaft mounted weights to provide a means for controlling actuation of the radially movable governor control valve 95 so as to provide a novel type of governor mechanism.

The governor 85 comprises the body portion 86 having a cylindrical bore 87 extending inwardly from one end thereof. Reciprocably mounted in the bore 87 are the cylindrical primary and secondary weights 88 and 89 respectively, which weights are telescopically arranged for movement relative to each other. Extending between the spaced, radially directed flanges 88a and 89a on the weights 88 and 89 respectively, is a preloaded compression spring 90 that tends to urge the weights 88 and 89 apart. A snap ring 91 mounted in the bore 87 of valve body 86 provides a seat for the primary weight 88 when it is moved outwardly a predetermined distance by centrifugal force due to the rotation of driven tailshaft 81. Mounted in the bore 88b in primary weight 88 is a snap ring 92 that provides a seat for the secondary weight 89 on the primary weight 88. Extending through aligned bores in the secondary weight 89 and the driven tailshaft 81 is a tie shaft 94 that has one end suitably anchored to the secondary weight 89 by means of a snap ring or the like. The other end of tie shaft 94 has mounted thereon the piston or slide type governor control valve 95. The governor valve 95 is arranged to reciprocate in the T-shaped or stepped bore 96 in the valve body 86. The bore 96 is aligned with and diametrically spaced from the bore 87. Governor piston valve 95 has spaced lands 95a and 95c of different diameters connected by a narrow neck portion 95b. Extending through the valve body 86 transversely to bore 96 and intersecting bore 96 are the pressure fluid inlet and outlet passages 97 and 98 respectively. Passage 97 (see Fig. 6) is arranged to be connected between the valve body bore 96 and the outlet 84a from rear oil pump 84. This connection of pump 84 to governor 85 is through the passage 99a in the valve body sleeve portion 99. Sleeve portion 99 is fixedly connected to the valve body 86 by bolts 99d. The pressure fluid inlet passage 84a, 99a, 97 thus provides a means for applying the pressure fluid from pump 84 to the stem portion of valve bore 96. The outlet passage 98 from the stem portion of the piston bore 96 is connected by sleeve passage 99b to a bore 99c which is joined to an outlet conduit 103. The conduit 103 conducts the pressure fluid discharged from the piston valve bore 96 to the cylinder 141d (see Fig. 10) in which is mounted the pilot valve 145 of the automatic control valve unit 140. Control valve unit 140 is subsequently described in detail. Valve body 86 also includes a relief port 101 to relieve the excess pressure of the fluid in bore 96 of the governor unit 85. Relief port 101 also acts as a means to balance the valve 95 in the bore 96 when it is acted on by the weights 88, 89 and the pressure fluid in bore 96. The valve body 86 is fixedly connected to the driven tailshaft 81 by the set screw 100. The governor tie shaft 94 is of such size as to be freely slidable in its shaft receiving bore through tailshaft 81 and is not required to serve as a means for fastening the governor body 86 to the shaft 81.

The governor 85, which functions as a fluid pressure regulating or pressure reducing valve, receives fluid under pressure from the rear pump 84 as soon as tailshaft 81 begins to rotate. This pressure fluid from pump 84 is admitted to the valve bore 96 through the passage 97 and a hydraulic pressure is applied to the opposed inner surfaces of valve lands 95a and 95c. As land 95c is larger in diameter than land 95a there is an unbalanced area which causes an unbalanced force to be applied to piston valve 95 which force tends to move valve 95 radially outward so as to cause valve land 95a to close off the pressure fluid inlet passage 97. Due to the rotation of tailshaft 81 there is also a simultaneously acting centrifugal force tending to urge the primary and secondary weights 88, 89 radially outward. As tie shaft 94 connects weights 88 and 89 to piston valve 95 it is obvious that the centrifugal force of the weights 88 and 89 and their connecting spring 90 is opposed by the hydraulic pressure applied to the unbalanced area of the piston valve land 95c. Consequently the centrifugal force of the elements 88, 89, 90 tends to move valve 95 so as to uncover the passage 97 and connect the pressure fluid inlet passage 97 to the valve bore 96 while the unbalanced hydraulic force applied to piston valve land 95c tends to shift valve 95 in the opposite radial direction so as to close off the connection between inlet passage 97 and valve bore 96.

The pressure fluid that is admitted to valve bore 96 is conducted through the outlet passages 98, 99b, 99c and 103 to other parts of the control system to actuate the various control devices that will be subsequently described in detail.

If the pressure of the fluid admitted to the bore 96 from inlet 97 becomes excessive and exceeds the centrifugal force of the elements 88, 89, 90 then valve 95 will move radially outward a sufficient amount to uncover the relief port 101 and the pressure fluid in the stem portion of bore 96 will spill out and reduce the pressure of the contained fluid to a value where a condition of equilibrium will again be set up between the centrifugal force of the elements 88, 89, 90 and the unbalanced force applied to the valve land 95c.

The weight portions 88, 89, 90 of the governor 85, being formed from two relatively movable weights connected by the resilient means 90, provides an arrangement that is particularly adapted for transmission control purposes. By this arrangement the operation of the governor may be so modified and controlled that the automatic upshifts and downshifts will occur at the most desirable times.

Any number of weights may be used to vary the number of shift steps and to obtain a more accurate control of the governor operation. If a single weight were used the speed-pressure curve (see Fig. 7) would be a second degree curve such as that indicated by the curve OXY. Use of the two resiliently connected weights 88, 89 produces a speed-pressure curve such as that shown in Fig. 7 by the curve OXZ. The advantage of a curve such as that shown by the line OXZ is that the slope of the two-step curve has been reduced considerably so that it now extends over a much greater speed range and consequently the upshifts and the downshifts may be effected over a greater speed range. The flexibility of the transmission has thus been improved by materially increasing the speed range during which the changes in speed ratio drive may occur. Not only does this multiple stage governor give a more flexible control, but in addition it gives a sensitive control due to the fact that the slope of the lower portion of the curve from O to X is sufficiently steep to provide adequate pressure fluid for positive efficient governor operation at relatively low vehicle speeds. This would not be the case if a single stage governor with a relatively small slope to its speed-pressure curve were used for then the pressures at low vehicle speeds would not be sufficient to positively operate the associated control mechanisms.

In operation, on initial rotation of the driven tailshaft 81 during vehicle acceleration from approximately 0 to 30 miles per hour, both weights 88, 89 are acting against the pressure applied to the unbalanced area of the valve land 95c. The primary weight 88 is acting through the preloaded spring 90 and the secondary weight is directly connected to the piston valve 95 through the tie shaft 94. At approximately 30 miles per hour the centrifugal force on the primary weight 88 exceeds the preload of spring 90 and the weight 88 moves radially outward and seats on the snap ring 91. Thereafter with speeds above 30 miles per hour the force exerted by the rear pump pressure fluid on the unbalanced area of the valve land 95c is balanced by the combination of the static force exerted by the compressed spring 90 and the centrifugal force of the secondary weight 89.

While the pressure of the fluid discharged from the pump 84 into the governor inlet passage 97 is substantially constant and greater than the pressure of the fluid discharged from the governor valve bore 96 into the outlet passage 98, due to the reducing valve action of piston valve 95, still, it is thought to be obvious that the pressure of the fluid discharged from the governor 85 is roughly proportional to the speed of the tailshaft 81 and that governor 85 provides an efficient, simplified form of speed sensitive control mechanism.

Cooperating with the speed sensitive governor 85 to control operation of this transmission is a torque responsive control means 120. The torque responsive control means 120 (see Figs. 9 and 10) that is operably associated with this transmission comprises the kickdown valve 121 and the throttle valve 123. This control means 120 is operated by the conventional throttle control or accelerator pedal 115 for the engine unit (not shown) that drives the transmission unit. Pedal 115 is connected to the kickdown valve 121 by the linkage 116. Kickdown valve 121 is arranged to reciprocate in the valve cylinder body 122 and is connected to the reciprocably mounted throttle valve 123 by a preloaded compression spring 124. At the closed throttle position of the accelerator pedal 115 with the manual control valve 170 set for Drive (see Fig. 10) the arrangement is such as to pressurize conduit 125 with pump pressure fluid, the land 123a of throttle valve 123 is positioned so as to substantially close cylinder port 122a and prevent the pump pressure fluid or so-called line pressure fluid (approximately 90 p. s. i.) in supply conduit 125 from being transmitted to chamber 122b of the valve cylinder 122. At closed throttle there is a sufficient preload on spring 124 to shift valve 123 to the right a sufficient amount to permit seepage of a certain amount of pressure fluid from conduit 125 around land 123a into chamber 122b to develop about 20 p. s. i. pressure in chamber 122b and in conduit 127 at closed throttle. Land 123a does not however prevent the line pressure fluid in conduit 125 from passing through the cylinder by-pass groove 122d and entering the conduit 126 that communicates with the line pressure inlet port 141a in one end of the cylinder body 141 of the automatic control valve mechanism 140. As the accelerator pedal 115 is depressed from its closed throttle position to initiate vehicle acceleration the kickdown valve 121 is moved to the right and this movement is transmitted by spring 124 to throttle valve 123 which latter valve is moved to the right a sufficient amount to uncover the line pressure inlet port 122a in cylinder body 122 and admit line pressure fluid from conduit 125 to the chamber 122b of the cylinder 122. The line pressure admitted to chamber 122b from inlet port 122a at partial depression of the accelerator pedal 115 is of a lower pressure than the line pressure in conduit 125 due to the reducing valve action of the throttle valve 123. The pressure of the fluid admitted to the chamber 122b by the reducing valve action of throttle valve 123 is hereafter referred to as throttle pressure. At wide open throttle with pedal 115 substantially depressed there is substantially a direct connection between conduit 125 and chamber 122b. Consequently, the throttle pressure in chamber 122b will about equal the line pressure in conduit 125. The admission of throttle pressure fluid to chamber 122b of cylinder 122 has a tendency to shift the throttle valve 123 to the left to oppose depression of the accelerator pedal for it will be noted that an axially extending bore 123d through the throttle valve 123 applies the throttle pressure fluid in chamber 122b to the bore 128a of the floating cup cylinder 128 at the right end of valve 123 which throttle pressure reacts against the right end of throttle valve land 123e and tends to balance the force of the pressure being applied to the left end of valve 123 by the accelerator pedal actuated kickdown valve 121. The bore structure 123d thus cooperates with the cup cylinder 128 at the right end of throttle valve 123 to provide a pressure regulator control for governing the pressure and the volume of the throttle pressure fluid introduced into the chamber 122b, the conduit 127, and the associated chamber 141b of automatic control valve 140.

The throttle pressure admitted to valve chamber 141b of automatic control valve unit 140 during initial depression of the accelerator pedal 115, when valve 170 is set for Drive, applies throttle pressure to the right end of land 150a of shift valve 150 which pressure assists the spring 151 in urging shift valve 150 towards the left end of valve cylinder 141. The positioning of the shift valve 150 at the left of its bore, as shown in Figs. 9 and 10, is the downshifted position of the valve 150. Thus during initial depression of accelerator pedal 115 the valve land 150a of shift valve 150 is positioned so that it covers line pressure inlet port 141a to the valve cylinder 140 and prevents line pressure from supply conduit 126 from passing into the chamber 141c of valve cylinder 141. The chamber 141c is connected by conduits 155, 155a and 155b (see Figs. 8 and 9) with the control piston 48 of direct clutch C and with the release side of the servo 59 of the planetary gear train 50. Thus it will be seen that the position of shift valve 150 controls engagement and disengagement of the direct drive clutch C as well as disengagement of the braking band 52 of the planetary gearing 50. It is therefor thought to be obvious that the position of shift valve land 150a controls the automatic upshifts and downshifts between the conventional accelerating underdrive ratio transmitted through compounded planetaries 50 and 60 and the cruising direct drive ratio transmitted through clutch C.

As the accelerator pedal 115 is further depressed during initiation of normal forward starting drive through compounded planetaries 50 and 60, the speed of driven tail shift 81 is increased and consequently the governor pressure, that is the pressure of the fluid directed from the governor outlet 98 through conduit 103 to the chamber 141d of the automatic control valve unit 140, is gradually increased. The governor pressure directed into chamber 141d of valve unit 140 is applied to the left end or head 145d of the pilot valve 145 which valve is reciprocably mounted in the valve cylinder 141. This governor pressure applied to the pilot valve 145 tends to shift the pilot valve towards the right (see Fig. 10). Movement of pilot valve 145 to the right is opposed by the throttle pressure fluid in chamber 141b which pressure is urging the shift valve 150 towards the left. The shift valve 150 is directly connected to the pilot valve 145 through the lead valve 146. Lead valve 146 is reciprocably mounted within a bore 145a in pilot valve 145 and is connected to the pilot valve through a preloaded compression spring 147. A snap ring 148 mounted in pilot valve bore 145a provides a seat for the lead valve 146 on the pilot valve 145 and limits relative movement of the lead valve 146 with respect to the pilot valve 145 in one direction.

As the speed of output shaft 81 increases the governor pressure applied to the chamber 141d and to the left end or head 145d of pilot valve 145 increases in intensity and creates a force that gradually overcomes the force of the throttle pressure in valve chamber 141b which latter force is applied to the underside of the head 145d of the pilot valve 145 through the series arranged shift valve 150 and the lead valve 146. When the force resulting from the governor pressure in chamber 141d exceeds the force exerted by the throttle pressure in chamber 141b and that of the spring 151 then the pilot valve 145 shifts towards the right and moves the shift valve 150 to the right at the same time. In the movement of pilot valve 145 towards the right by the governor pressure in chamber 141d, the throttle pressure feed port 145b in the skirt of pilot valve 145 is aligned with the throttle pressure inlet port 141e in cylinder 141 before the valve land 150a of shift valve 150 has been moved sufficiently to the right to uncover the line pressure inlet port 141a to the interior of cylinder 141. As soon as the throttle pressure feed port 145b in pilot valve 145 is aligned with the throttle pressure inlet port 141e then throttle pressure from conduit 157 is admitted to the interior of the bore 145a in the pilot valve and to the annular groove 145e in the pilot valve skirt portion. Admission of throttle pressure fluid to the groove 145e in the skirt of the pilot valve 145 fills connected conduits 158 and 159 and lag pressure chamber 141f of cylinder 141 with throttle pressure fluid. Admission of throttle pressure fluid to the lag pressure chamber 141f of valve body 141 applies a rightwardly directed force to the lag area 150b at the left end of land 150c of the shift valve 150. This rightwardly directed, throttle pressure generated force applied to the shift valve 150 combines with the governor pressure force applied to the head 145d of pilot valve 145 to overcome the leftwardly directed, throttle pressure generated force that is being applied to the right end of land 150a of the shift valve 150. As a result of the sudden rearrangement of the forces applied to the shift valve 150, due to the admission of throttle pressure to the lag pressure chamber 141f, the shift valve 150 is suddenly shifted or snapped towards the right and the line pressure inlet port 141a is connected to the chamber 141c of valve body 141 so that line pressure from conduit 126 is now admitted to the conduit 155 and directed by branch conduit 155b (see Figs. 8 and 9) into the direct clutch C to cause engagement of the clutch C. At the same time line pressure from conduit 155 will be directed by branch conduit 155a into port 59a on the release side of servo 59 to disengage the brake band 52. The transmission unit has thus been automatically upshifted from the accelerating underdrive ratio to direct drive as a result of the coordinated action of the hydraulic governor 85, the torque responsive control unit 120, and the automatic control valve unit 140.

Another advantage of the application of throttle pressure to the lag pressure chamber 141f, during the upshift of the shift valve 150, is that the throttle pressure in chamber 141f now assists the governor pressure applied to the head 145d of the pilot valve 145 so that after the upshift a lower governor pressure is required to hold the shift valve 150 in its upshifted position. Consequently, the downshift of valve 150 from its upshifted position occurs at a lower vehicle speed than the speed required for accomplishing the upshift of valve 150. This is quite advantageous in that it eliminates unnecessary automatic downshifting and upshifting of the shift valve 150 at low car speeds while operating in the cruising direct drive ratio. Accordingly, wear of the transmission is reduced and smoother transmission performance is obtained.

Another important feature of the automatic control valve unit 140 is the snap action shift of the shift valve 150 when throttle pressure fluid is admitted to the lag pressure feed port 145b of the pilot valve 145. Due to the conduit arrangement whereby the throttle pressure entering port 145b from conduit 157 is suddenly applied to the lag pressure area 150b of shift valve 150, the shift valve 150 is snapped towards the right to open line pressure inlet port 141a and direct line pressure from conduit 126 into conduit 155 from where it is directed into the direct clutch C and into the release side of servo 59. This snap action of shift valve 150 on upshift prevents hunting of the shift valve 150 and facilitates quick smooth operation of the clutch C and the planetary brake band servo 59.

On admission of throttle pressure to the inlet port 145b and to the bore 145a of the pilot valve 145, during the movement of shift valve 150 to its upshifted position at the right end of cylinder 141, the lead valve 146 is moved towards the right in the pilot valve bore 145a the distance X until the lead valve 146 comes to rest on the pilot valve snap ring seat 148. The effect of this movement of the lead valve 146 relative to the pilot valve 145 is to increase the effective length of the lead valve by the distance X so as to insure snap action of the shift valve 150 when accomplishing the automatic downshift from direct drive to the accelerating underdrive ratio. Here again snap action of shift valve 150 on downshift will prevent hunting of the shift valve and will bring about quick, smooth operation of the direct clutch C and the servo 59 that controls the compounded planetary gearing 59, 60. Due to the elongation X of the pilot and lead valve assembly during upshift of the shift valve 150, on downshift the throttle pressure in the lag pressure chamber 141f and the bore 145a, as well as in the conduits 158 and 159, will be vented through port 141g of the cylinder 141 before the valve land 150a of the shift valve 150 has shifted to the left a sufficient amount to close off the line pressure inlet port 141a to simultaneously cause disengagement of the direct clutch C and application of brake band 52 to accomplish the downshift to the accelerating underdrive ratio. After the throttle pressure in pressure chambers 141f and 145a has been vented through drain port 141g of cylinder 141 then the lead valve 146 moves towards the left off its seat 148 until valve stem 146b abuts against the inner side of the head 145d of pilot valve 145. Thereafter the land 150a of the shift valve 150 closes the line pressure inlet port 141a and the line pressure in conduit 155 is vented through drain port 141h.

While most upshifts and downshifts of the shift valve 150 will occur automatically and be controlled by the relationship between the throttle pressure and the governor pressure, still, there are times when it is advantageous to have a manually controlled means to overrule the automatic control valve unit 140 in order to effect a kickdown or downshift from direct drive to the accelerating underdrive ratio when operating at a speed above that at which the automatic downshift would occur. Such a manually controlled kickdown means is included in this control system. To effect such a kickdown it is merely necessary to depress the accelerator pedal 115 beyond its wide open throttle position and this will shift the valve land 121b of kickdown valve 121 to the right a sufficient amount to connect conduit 159 with the drain port 122g. Port 122g includes the pressure relief valve 129 which reduces the pressure in the lag pressure chamber 141f to the pressure setting of relief valve 129 (12 p. s. i.). This venting of the throttle pressure from the lag pressure chamber 141f through relief valve 129 reduces the forces holding the shift valve 150 in upshifted position and conditions the automatic control valve unit 140 for a downshift provided the throttle pressure in chamber 141b is sufficient to overrule the governor pressure in chamber 141d. When the kickdown valve 121 is depressed beyond its open throttle position to accomplish a kickdown it will be noted that the valve land 121c of valve 121 will block off the inlet port 122f from conduit 158 and the passageway connecting conduit 158 with conduit 159 through the cylinder area surrounding the neck portion 121a of the valve 121. Valve land 121c thus prevents flow of throttle pressure fluid from conduit 158 to conduit 159 through the aforementioned passageway in the valve cylinder 122. To insure a sufficient supply of throttle pressure fluid to the conduit 159 and lag chamber 141f during kickdown so as to maintain a reduced pressure in conduit 159 of approximately the setting of kickdown relief valve 129 (12 p. s. i.) the conduits 158 and 159 are connected by a small bleed bore 122k. Bore 122k permits a small amount of throttle pressure fluid in conduit 158 to bleed into the conduit 159 so as to pressurize conduit 159 and compensate for leakage and at the same time maintain sufficient throttle pressure in the conduit 158 and the automatic control valve unit 140 to insure proper functioning of the valve unit 120. Loss of throttle pressure in the valve unit 140 due to a venting of conduit 158 through relief valve 129 might prevent a downshift of shift valve 150 due to insufficient throttle pressure in chamber 141b to overrule the governor pressure in chamber 141d.

With the throttle pressure in chamber 141f reduced to (12 p. s. i.) due to the kickdown valve 121 venting the lag chamber 141f through the relief valve 129, conditions are such that the throttle pressure in chamber 141b may then overcome the force of the governor pressure in chamber 141d and the shift valve 150 will shift towards the left to complete the kickdown to the underdrive ratio. It is obvious that at very high vehicle speeds the governor pressure in chamber 141d may be so great that the throttle pressure in chamber 141b can not overcome the effect of the governor pressure in chamber 141d and then a kickdown is impossible. The automatic control valve unit 140 thus provides an upper limit kickdown level which prevents kickdown at very high speeds. This prevents damage to the transmission and insures smooth transmission performance. It will be noted that the diameter of the pilot valve 145 is greater than the diameter of shift valve 150 therefore with substantially equal throttle and governor pressures, such as may exist at high vehicle speeds, a downshift will not be accomplished due to the greater force effect of the governor pressure in chamber 141d holding the shift valve 150 in upshifted position.

The control system shown in Figs. 8 and 9 also includes the conduits 181 and 182 which connect the pumps 25 and 84 respectively with a pressure regulator valve unit 185. Spring 186 of pressure regulator valve 185 determines the pressure that is to be maintained in the pressure fluid supply conduit 191 that connects regulator valve 185 to the manual control valve unit 165. A pressure of approximately 90 p. s. i. in conduit 191 has been found to be satisfactory for operation of this transmission control system in the Drive and Coast ratios whereas a pressure of approximately 180 p. s. i. is used for Reverse and Low. Pressure regulator valve 185 provides each of these pressures in a manner that is subsequently explained. The pump output conduits 181 and 182 each include check valve 183 and 184 respectively to insure a suitable pressure head in the control system at all times. With the control arrangement shown the pump 25 supplies the fluid pressure for starting drive under ordinary conditions and as the speed of output shaft 81 increases the pump 84 automatically takes over and feeds the manual control valve supply conduit 191. As pump 84 comes into operation the pressure fluid supplied therefrom is transmitted (see Fig. 9) by conduit 182a to chamber 187a of pressure regulator valve body 187 and this pump pressure acts on piston valve 188 and moves valve 188 towards the left compressing spring 186. Movement of valve 188 to the left displaces this valve sufficiently so as to connect conduit 181 to drain conduit 189 thereby providing a by-pass for the output of the front pump 25. Upon the operation of either pump 25 or 84 the fluid pressure in conduit 182a is always sufficient to move valve 188 slightly to the left so as to connect conduit 182a with conduit 192 which supplies pressure fluid to the torque converter unit A. This arrangement maintains the converter unit A full of fluid during all operation thereof. Restriction 193 in conduit 192 controls the volume of the fluid supplied to the converter A. The fluid directed through the converter A is returned to the supply sump 26 through the conduit 194 that is connected to suitable pressure fluid cooling means 195. Conduit 196 leading from the cooling means 195 is connected to a valve unit 197 that includes the pressure relief valve 198 for controlling the pressure of the fluid supplied to the converter unit A. This converter pressure control valve 198 maintains a pressure of about 40 pounds per square inch in the converter unit A. Valve unit 197 also includes a lubrication system pressure control valve 199. Conduit 200 connects valve unit 197 to the supply sump 26.

The manual controls for this transmission unit (see Figs. 8, 9, 10, 11 and 12) include the drive selector lever 111 which is rotatably mounted on the conventional vehicle steering column 112. Control lever 111 is connected to the manually operated control valve 170 of valve unit 165 by the linkage arrangement 113. Drive selector lever 111 has six positions as clearly shown in Figs. 11 and 12. These positions include Neutral, Park, Coast or manually controlled kickdown, Drive, Low and Reverse. The six positions are denoted by the letters N, P, C, D, L, and R respectively in the various figures of the drawings.

The control segment 106 (see Figs. 11 and 12) for the drive selector lever 111 is preferably mounted on steering column 112 and is arranged such that the shift from Neutral to Reverse does not require a shift of lever 111 through a forward drive gear ratio and thus accidental movement of the vehicle forwardly while conditioning the transmission for reverse drive is prevented. By locating the control positions of the drive selector lever 111 for Reverse and Low drive in the same plane and in a plane displaced from the plane of the other gear shift control positions it is extremely easy to shift the lever 111 between these two control positions to rock the vehicle forwardly and rearwardly to provide a means for driving out of ruts or the like. To reach either Reverse or Low drive control positions the gear shift lever 111 is raised above the plane containing the Neutral, Coast and Drive positions. The shift from Neutral position to Drive position, which is the usual position for the starting and cruising drive ratio, involves a shift of the drive control lever 111 in only a single plane and thus provides an easily operable arrangement. Shift from the Drive position into the Coast position for braking purposes or for kickdown to a high speed accelerating gear is readily obtainable for here again the drive control lever 111 is moved but a short distance in a single plane. It is thought to be obvious that the control pattern for the shift lever 111 is arranged for a minimum of movement and maximum efficiency and safety.

Mounted on the driven tailshaft 81 (see Fig. 5) rearwardly of the governor 85 are the speedometer worm and pinion gearing 105 and the parking spur gear 106. Parking gear 106 is keyed to shaft 81 and is arranged to be engaged by the sprag 107 which is slidably mounted in a slideway casing 108a carried by the tailshaft housing 108. Sprag 107 is adapted to be actuated by the drive selector lever 111 through linkage 109. From a consideration of Figs. 5 and 5A it will be apparent that actuation of lever 109 rotates shaft 109a and rocks lever arm 109b. Lever arm 109b pivotally mounts a roller 109c that rides in a slot 107a in the sprag 107. Actuation of lever 109 will reciprocate sprag 107 vertically and move it into and out of engagement with the gear 106 on tailshaft 81. A compression spring 107c engages a pin 107b carried by sprag 107 and tends to urge the sprag 107 out of engagement with the gear 106. To positively lock up the transmission tailshaft 81 for parking purposes it is merely necessary to depress the drive control lever 111 from its Neutral control position to the Park position directly below Neutral and the sprag 107 will engage the spur gear 106 and anchor the tailshaft 81 to the tailshaft housing 108.

*Operation*

When drive selector lever 111 is in the Neutral position (see Fig. 10) then land 170a of manual control valve 170 will be positioned across the inlet port 171a of valve body 171 so that supply conduit 191 can not direct pressure fluid into any of the control conduits branching out from valve body 171. Accordingly, none of the planetary brake bands 52, 62, and 72 nor the direct clutch C will be engaged and neither a forward nor reverse drive is transmittable to the output shaft 81. The front pump 25 at this time will merely circulate fluid through the converter A and the lubrication system while the rear pump 84 is inactive.

If the drive selector lever 111 is moved to the forward Drive position (as shown in Figs. 8, 9 and 10) valve land 170b of manual control valve 170 will be positioned to the right of outlet port 171b so that pressure fluid from supply conduit 191 passes through the manually operated control valve assembly 165 and into the control conduits 125, 126, 201 and 205. It will be noted that the line pressure fluid in conduit 125 is conducted by branch conduit 125a to the "apply" or "on" side of servo 59 so as to activate the compounded planetary gearing 50, 60 for transmission of the normal starting forward underdrive. At the same time pressure fluid in branch conduit 125a will apply pressure to the "release" or "off" side of Low gear servo 69 to neutralize the effect of the pressure fluid transmitted to the "apply" or "on" side of servo 69 by the conduit 201. Low planetary brake band 62 will accordingly be released during normal starting drive. As Reverse drive supply conduit 202 and Coast drive supply conduit 203 are both blocked off from the line pressure supply conduit 191 by the lands 170a and 170b respectively of control valve 170, when control valve 170 is positioned for Drive, obviously reverse planetary 70 will not be activated and the shift valve 150 will not be locked in its downshifted Coast position so as to prevent the automatic upshift to direct drive when the speed and torque conditions for accomplishing such an upshift are attained.

Prior to depression of the accelerator pedal 115 from its closed throttle position, when drive selector lever 111 is positioned in Drive, the throttle valve 123 and the shift valve 150 will be so positioned in their respective valve cylinders that sufficient pressure fluid from conduits 125 and 126, will not be introduced into either of these control valve mechanisms nor into the conduit 155 to cause engagement of direct clutch C. Furthermore, the engine speed at closed throttle with the transmission set in the forward Drive position will be such that slip in the torque converter unit A and drag of the associated drive train elements will prevent a forward drive being transmitted to the driven shaft 81 even though the planetary brake band 52 is applied to activate the compounded gearing 50, 60.

Subsequently, as the accelerator pedal 115 is depressed to increase the speed of the driving engine unit (not shown) and to initiate forward movement of the vehicle, the throttle valve 123 will be moved towards the right in the manner previously described and sufficient throttle pressure fluid from valve chamber 122b of the torque responsive valve unit 120 will be admitted to the control conduits 127, 127a and to the chamber 141b of the automatic control valve unit 140 so as to condition the control system for the automatic upshift to direct drive. During initial depression of the accelerator pedal 115 the force of the throttle pressure on the right end of land 150a of shift valve 150 is greater than the force of the governor pressure in chamber 141d that is transmitted to the left end of shift valve 150 by the pilot valve assembly. Accordingly, the shift valve 150 will be urged towards the left and positioned so that land 150a blocks off the line pressure inlet port 141a from the conduit 126 and consequently line pressure fluid cannot be introduced into conduits 155, 155a and 155b to effect engagement of the direct clutch C and disengagement of brake band 52 of the compounded planetary gearing 50, 60 which gearing is arranged for the transmission of the starting forward drive. Accordingly, during initial forward acceleration in the Drive ratio the relatively high torque multiplication of the converter unit A is combined with the torque multiplication effect of the compounded planetary gearing 50, 60 to provide an efficient, highly effective, torque multiplying underdrive. This drive is from drive shaft 8 through converter A to turbine driven intermediate driven shaft 16 and then through compounded planetary 50, 60 to the output shaft 81.

On continued depression of the accelerator 115 and increase in the output shaft speed there occurs the previously described automatic upshift to direct drive. As the speed of output shaft 81 increases, and the torque load decreases, the speed responsive governor pressure in chamber 141d of the automatic control valve 140 will increase and overrule the torque responsive throttle pressure in chamber 141b of the control valve unit whereupon shift valve 150 will upshift towards the right to effect engagement of the direct clutch C and disengagement of brake band 52. This upshift converts the accelerating relatively high torque multiplying underdrive into an efficient direct drive for cruising purposes.

On upshift of valve 150 line pressure fluid is admitted to the conduit 155 from conduit 126 through valve unit 140. This pressure fluid is conducted to the direct clutch C through the clutch drain valve 204 and through the branch conduit 155b. Admission of pressure fluid to clutch C locks up planetary gearing 50, 60 and conditions the transmission for the transmission of the cruising direct drive. Pressure fluid admitted to valve 204 from conduit 155 is also transmitted by conduit 155a to the "release" or "off" side of servo 59 to effect disengagement of the planetary brake band 52 and thereby terminate the accelerating underdrive.

The clutch drain valve 204 (see Fig. 9) includes a piston type valve member 206 having a T-shaped bore 206a which permits the direct clutch C to drain to atmosphere immediately on downshift of the shift valve 150 which arrangement facilitates a quick smooth downshift from direct drive. Prior to upshift of valve 150 the line 155 is not pressurized and the pressurized fluid that had previously been used to apply direct clutch C can drain out of clutch C by way of line 155b and the inverted T-shaped bore 206a in slide valve 206. Valve 206 will be positioned as shown in Fig. 9 prior to upshift. The end of the valve case (not shown) containing the spring supporting the valve 206 is open to the drain for the control system. When an upshift is effected then line 155 is pressurized and this urges valve 206 upwardly to compress its valve spring and pressurize line 155b to apply clutch C. Drain 206a is blocked off at this time. Also line 155a will then be pressurized and fluid directed to port 59a of servo 59 will then release band 52.

It is thought to be obvious that the automatic upshifts and downshifts will occur at varying speeds depending on the relationship existing between the governor pressure and the throttle pressure under varying conditions. At light throttle when the torque requirement is relatively low the upshift will occur at about 18 miles per hour whereas at open throttle with a relatively high torque load the upshift will occur at about 55 miles per hour vehicle speed. The automatic downshifts will likewise vary with the speed and torque relationships but, as previously pointed out, the downshift for a given speed and torque condition will be at a lower vehicle speed than the corresponding upshift due to the effect of the lag pressure in valve chamber 141f of the control valve 140.

If, while traveling in the cruising direct drive ratio, a high speed accelerating underdrive is desired then a kickdown to a more favorable accelerating ratio may be manually effected by merely depressing the accelerator pedal 115 slightly beyond its wide open throttle position and thereafter kickdown valve 121 will effect the kickdown or downshift in the manner previously described.

It will be noted that whenever the transmission is set for Drive that the throttle pressure in branch conduit 127a is conducted to the "apply" or "on" side of servo 59. Thus the force applying the band 52 is always directly proportional to the throttle pressure. This is quite advantageous as it tends to smooth out the application of the band 52 and to also reduce slip of the band during the upshifts and downshifts.

In addition to the automatic downshift from direct drive to the accelerating underdrive, which downshift is primarily controlled by the speed responsive governor 85, and the manually effected kickdown ratio, which is accomplished by maximum depression of the foot accelerator 115, there is still a third way in which to effect a downshift from direct drive to the accelerating underdrive with this transmission control system. This transmission control system includes a Coast drive ratio wherein the accelerating underdrive ratio used for starting forward drive is used for coast braking. The Coast drive ratio provides a means for locking the shift valve 150 in its downshifted position so as to prevent an automatic upshift to direct drive even though the speed and torque conditions are proper for such an upshift. Coast drive is obtained by shifting the drive selector lever 111 into the position indicated for Coast. Such a shift positions valve land 170b adjacent the right edge of outlet port 171c and permits line pressure from conduit 191 to pass into conduit 203 which directs the line pressure fluid into chamber 141k of the automatic control valve cylinder 141. Line pressure in chamber 141k will prevent the governor pressure in chamber 141d from shifting the pilot and lead valve assembly 145, 146 to the right so as to upshift the shift valve 150. It will be noted that when the manual control valve 170 has been shifted to the Coast drive position so as to locate land 170b of valve 170 adjacent the right edge of the outlet 171c to conduit 203, that then line pressure fluid is also being admitted to the Low gear control conduit 201 and to the Drive control conduit 125. As previously explained the Low ratio servo 69 is not activated at this time for line pressure fluid is being directed into both the apply and release sides of the servo 69. The line pressure from the Drive outlet port 171b entering conduit 125 is conducted through branch conduit 125a to the servo 59 so as to apply brake band 52 and activate the compounded planetary gear trains 50 and 60 to condition the transmission unit for the accelerating underdrive ratio that is also used for coast braking purposes.

The Low drive ratio which is usable for extremely difficult forward starting drive and also for coast braking is obtainable by a shift of the drive selector lever 111 to a position such that valve land 170b of control valve 170 is adjacent the right edge of the outlet port 171d of valve body 171 so as to direct line pressure into control conduit 201. At this position of valve land 170b it will be noted that line pressure fluid from conduit 191 is not admitted to control conduits 125, 203, 202 or 205. Without line pressure in conduit 205 there will be no pressure fluid in valve chamber 187c of the regulator valve unit 185 to assist the pressure fluid in valve chamber 187a in shifting pressure regulator valve 183 to the left against the force of spring 186. This materially raises the limiting pressure of the regulator valve unit 185 in Low drive ratio. Consequently in Low drive the pressure in the conduit 201 applying the Low drive brake band 62 is approximately 180 p. s. i. whereas in Drive and Coast the servo applying pressure is about 90 p. s. i. due to the fact that valve chamber 187c contains line pressure fluid. This increased pressure for applying the Low brake band 62 is necessary to take the increased torque reaction resulting from use of the Low gear ratio. With the line pressure from conduit 191 being directed into only conduit 201 it is obvious that only brake band 62 of gear box B will be applied and that the other gear trains 50 and 70 and the direct clutch C are inactive whenever the transmission is conditioned for Low drive. The drive train for Low is from driving shaft 8 through converter A and turbine driven intermediate shaft 16 to planetary 70 and thence to driven tailshaft 81.

If the Low drive is to be used for coast braking then shift of drive selector lever 111 from its Drive position to the Low control position moves manual control valve 170 to the left and valve land 170b of valve 170 will be positioned adjacent the right edge of the Low outlet port 171d of valve body 171. As the supply of line pressure fluid to conduits 125, 126 and 155 has now been cut off by valve land 170b the direct clutch C will begin to release by draining through its drain valve 204 and through conduits 155b, 155 and the drain port 141h in valve body 141. Also the pressure fluid in conduit 155a applied to the release side of servo 59 will begin to drain through port 141h and brake band 52 thus will be applied to accomplish a downshift to the starting underdrive gear ratio. At the same time pressure fluid in conduits 125, 125a and 125b will begin to drain back through conduit 125 and the manual control valve 170 and out through the associated drain port 171g in valve body 171. Drainage from conduit 125 through drain port 171c is restricted somewhat due to the fact that when the drive selector lever 111 is set for Low then the location of valve land 170c of manual control valve 170 in the opening formed by the annular shoulder 171i of valve body 171 materially restricts the passage of the draining fluid past valve land 170c to drain port 171g. As a result of the restricted drainage from conduit 125 to drain port 171g, on the downshift from Drive to Low, the band 52 will first be applied to accomplish a downshift from direct drive to the starting underdrive ratio and thereafter, when the apply side of servo 59 has been sufficiently drained through the port 171g, the braking band 52 will be released and servo 69 activated to apply Low brake band 62 to effect the activation of the Low planetary gearing 60. Thus it will be seen that the downshift from Drive to Low is a two step downshift through the starting underdrive gearing. This step-by-step downshift gives smooth operating performance and tends to cushion the reaction forces applied to the several planetary brake bands involved in this downshift. Another advantage of the restricted drainage of the pressure fluid through the valve 165 is that it brings about a gradual build up in the pressure of the fluid applying servo 69. As this pressure must be increased to 180 p. s. i. on the downshift the fact is of considerable importance.

Another feature associated with the downshift from Drive or Coast to Low is the prevention of a downshift into Low when the vehicle speed is at such a relatively high value that such a downshift might produce rough transmission performance or be detrimental to the elements of the gear box mechanism B. It will be noted from Fig. 10 that the right end of manual control valve body 171 has a bore 171j that reciprocably receives a hollow sleeve piston 173. Piston 173 is normally urged on a snap ring seat 174 by a preloaded compression spring 175. Piston 173 has an inwardly disposed, radially extending shoulder 173a adapted to be engaged with the snap ring 176, mounted on the right end of control valve 170 when valve 170, is shifted to the Low control position. Piston 173 is provided with a peripheral channel 173b that forms a chamber for receiving governor pressure fluid from the governor 85. The pressure fluid from governor 85 is transmitted to chamber 173b through the conduits 98, 103a. It is thought to be obvious that the governor pressure in channel 173b will tend to hold the piston 173 against its seat 174 and thus resist shift of the valve 170 towards the left to the Low control position. At low vehicle speeds a shift of control lever 111 to the Low position will cause snap ring 176 on valve 170 to engage piston shoulder 173a on hollow piston 173 and the manual effort transmitted to the piston valve 170 through the control lever linkage 11, 113, 220, the yoke 221 and the compression spring 222 will overcome the force of the governor pressure acting on the piston 173 and will permit a shift of the piston valve 170 and the sleeve piston 173 to the left to the Low control position. However, at high vehicle speeds the governor pressure in channel 173b is of such a value that shift of the drive selector lever 111 to the Low control position cannot shift the sleeve piston 173 leftwardly and movement of selector lever 111 to the Low control position merely compresses the yoke spring 222 and does not effect movement of the manual control valve to the Low control position. The piston 173, its associated parts and the compression spring 222 and its associated parts thus provide a limiting valve structure to control the speed at which a downshift from Drive to Low may be accomplished.

Reverse drive may be obtained by moving the drive selector lever 111 to the Reverse control position. This positions the manually operated control valve 170 in such a position that the valve land 170a of valve 170 is adjacent the right edge of the line pressure inlet port 171a so that pressure fluid from supply conduit 191 is directed into the outlet port 171e at the left end of valve body 171 then into the reverse band control conduit 202. At this time drain port 171f and all forward drive control conduits are blocked off from line pressure supply conduit 191. The forward drive control conduits 125, 201, 203 and 205 at this time are opened to the sump 26 through valve 171 and drain 171g so as to drain the pressure fluid from both the direct drive clutch D and the servo control units 59 and 69. Admission of pressure fluid to the Reverse control conduit 202 actuates the Reverse band servo 79 and applies reverse braking band 72 so that the planetary gearing 70 will transmit a reverse drive from input shaft 8 and turbine driven shaft 16 through planetary gearing 70 to output shaft 81. It will be noted that with the manual control valve 170 positioned for Reverse drive that line pressure fluid from supply conduit 191 will not be directed through conduit 205 into the chamber 187c of the pressure regulator valve body 187 therefore the pressure regulator valve 185 will function in such a manner as to cause an increased pressure (180 p. s. i.) to be applied to the Reverse band servo 79 as was the case when Low gear drive was activated. The increased pressure in servo 79 is necessary to take the higher torque reaction applied to the band 72 as a result of the gear ratio of reverse planetary 70.

It is thought to be obvious from the foregoing description that there is provided an improved, highly flexible, simplified type of completely hydraulic control system for a vehicle transmission unit or the like which system will automatically control all normal forward drive through the transmission unit and will also provide satisfactory controls for the manually operated emergency forward and reverse drives. Furthermore, this control system includes certain control components which singly represent improvements over the prior art.

I claim:

1. In a hydraulically operated torque and speed responsive control system for a change speed transmission or the like, an automatically operable control valve unit having a pair of axially aligned, connected, cylinder bores therein, a shift valve reciprocably mounted in one of said bores and a pilot valve reciprocably mounted in the other bore, a lead valve telescopically mounted within a bore in said pilot valve and engageable with portions of said shift valve, a torque responsive pressure fluid inlet to one portion of said one bore to apply torque responsive pressure fluid to said shift valve to urge it in one direction, a speed responsive pressure fluid inlet to one portion of said other bore to apply speed responsive pressure fluid to said pilot valve to urge it in the opposite direction, and conduit means connected between said torque responsive pressure fluid supply and another portion of the bore for said shift valve, after a predetermined movement of said pilot valve in said opposite direction, to provide means for effecting a snap action shift of said shift valve in said opposite direction.

2. In a hydraulically operated torque and speed responsive control system for a change speed transmission or the like, a control valve unit having a pair of axially aligned, connected, cylinder bores therein, a shift valve reciprocably mounted in one of said bores and a pilot valve reciprocably mounted in the other bore, a lead valve reciprocably mounted within a bore in said pilot valve and engageable with portions of said shift valve, a torque responsive pressure fluid inlet to one portion of said one bore providing means to urge said valves in one direction, a speed responsive pressure fluid inlet to said other bore providing means to urge said valves in the opposite direction, and conduit means adapted to be connected between said torque responsive pressure fluid supply and the bore in said pilot valve, after a predetermined movement of said pilot valve in said opposite direction, to provide means for effecting relative movement between said pilot valve and said lead and shift valves whereby the effective length of said lead valve is increased.

3. In a hydraulically operated torque and speed responsive control system for a change speed transmission or the like, a control valve unit having a pair of axially aligned, connected, cylinder bores therein, a shift valve reciprocably mounted in one of said bores and a pilot valve reciprocably mounted in the other bore, a lead valve reciprocably mounted within a bore in said pilot valve and engageable with portions of said shift valve, a torque responsive pressure fluid inlet to one portion of said one bore to provide means to urge said valve in one direction, a speed responsive pressure fluid inlet to said other bore to provide means to urge said valves in the opposite direction, and conduit means adapted to be connected between said torque responsive pressure fluid supply and the bore in said pilot valve in said opposite direction, after a predetermined movement of said pilot valve, to provide means for effecting relative movement between said pilot valve and said lead and shift valves whereby the effective length of said lead valve is increased, and conduit means connected between said other bore for said pilot valve and another portion of the bore for said shift valve, after a predetermined movement of said pilot valve in said opposite direction to provide means for effecting a snap action shift of said shift valve.

4. In a hydraulically operated torque and speed responsive control system, an automatically operated control valve unit having a pair of aligned, connected cylinder bores, a shift valve reciprocably mounted in one of said bores, a pilot valve reciprocably mounted in the other of said bores, a lead valve reciprocably mounted in said other bore and telescopically arranged within said pilot valve, said lead valve being engageable with said shift valve, to effect movement thereof, a torque responsive pressure fluid inlet to said one bore, providing means for effecting shift of said valves in one direction, a speed responsive pressure fluid inlet to said other bore providing means for effecting shift of said valves in the opposite direction, conduit means arranged to apply torque responsive pressure fluid to said shift valve and to said lead valve, after a predetermined shift of said pilot valve in said opposite direction whereby snap action shift of said shift valve in said opposite direction will be accomplished and the effective length of said lead valve increased, and a control mechanism controllable by actuation of said shift valve.

5. In a hydraulically operated speed and torque responsive control system, an automatically operable control valve unit comprising a cylinder with a pair of connected bores therein, a first valve reciprocably mounted in one of said bores, a second valve reciprocably mounted in said other bore, a third valve reciprocably mounted in said second valve and engageable with said first valve to effect actuation thereof, said third valve being movable by as well as movable relative to said second valve, a torque responsive pressure fluid inlet to said one bore providing means to effect movement of said valves in one direction, a speed responsive pressure fluid inlet to said other bore providing means to effect movement of said valves in the opposite direction, conduit means arranged to apply torque responsive pressure fluid to said other bore to effect relative movement between said second and third valves after a predetermined conjoint movement of said second and third valves in said opposite direction, said relative movement between said second and third valves increasing the effective length of said third valve, and a control mechanism operable by the actuation of said first valve.

6. In a hydraulically operated speed and torque responsive control system, an automatically operable control valve unit comprising a cylinder with a pair of connected bores therein, a first valve reciprocably mounted in one of said bores, a second valve reciprocably mounted in said other bore, a third valve reciprocably mounted in said second valve and engageable with said first valve to effect actuation thereof, said third valve being movable by as well as movable relative to said second valve, a torque responsive pressure fluid inlet to said one bore providing means for the application of a force to one end of said first valve to effect movement of said valves in one direction, a speed responsive pressure fluid inlet to said other bore providing means for the application of a force to one end of said second valve which latter force is transmittable by said third valve to said first valve to effect movement of said valves in the opposite direction and oppose the torque responsive force applicable to said one end of said first valve, conduit means arranged to apply torque responsive pressure fluid to said other bore and to the end of said first valve opposite said aforementioned one end after the force of the speed responsive pressure fluid applied to said second valve has moved said second valve a predetermined amount in said opposite direction, and control means operable by the actuation of said first valve.

7. In a hydraulically operated speed and torque responsive control system, an automatically operable control valve unit comprising a cylinder with a pair of connected bores therein, a first valve reciprocably mounted in one of said bores, a second valve reciprocably mounted in said other bore, a third valve telescopically mounted in said second valve and reciprocably mounted in said other bore and engageable with said first valve to provide a means to effect actuation thereof, said third valve being movable by as well as movable relative to said second valve, a torque responsive pressure fluid inlet to said one bore providing means for the application of a force to one end of said first valve to effect movement of said valves in one direction, a speed responsive pressure fluid inlet to said other bore providing means for the application of a force to one end of said second valve which latter force is transmittable by said third valve to said first valve to effect movement of said valves in an opposite direction and to oppose the torque responsive force applicable to said one end of said first valve, conduit means arranged to apply torque responsive pressure fluid to the end of said first valve opposite said aforementioned one end after the force of the speed responsive pressure fluid applied to said second valve has moved said second valve a predetermined amount in said opposite direction, and control means operable by the actuation of said first valve.

8. In a hydraulically operated speed and torque responsive control system, an automatically operable control valve unit comprising a cylinder with a pair of connected bores therein, a first valve reciprocably mounted in one of said bores, resilient means normally positioning said first valve in said one bore, a second valve reciprocably mounted in said other bore, a third valve telescopically mounted in said second valve and reciprocably mounted in said other bore and having portions engageable with said first valve to effect actuation thereof, said third valve being movable by as well as movable relative to said second valve, a torque responsive pressure fluid inlet to said one bore providing means for the application of a force to one end of said first valve to effect movement of said valves in one direction, a speed responsive pressure fluid inlet to said other bore providing means for the application of a force to one end of said second valve which latter force is transmittable by said third valve to said first valve to effect movement of said valves in an opposite direction and to oppose the torque responsive force applicable to said one end of said first valve, conduit means arranged to apply torque responsive pressure fluid to said other bore and to the end of said first valve opposite said aforementioned one end after the force of the speed responsive pressure fluid applied to said second valve has moved said second valve a predetermined amount, and control means operable by the actuation of said first valve.

9. In a hydraulically operated control system, an automatically operable control valve unit comprising a cylinder with a pair of aligned spaced, valve bores connected to a pressure chamber located therebetween, a first valve reciprocably mounted in one of said bores, spring means normally positioning said first valve in said one bore, said first valve having a portion thereof extending into said pressure chamber, a second valve reciprocably mounted in said other bore, means carried by said second valve adapted to be engaged with said first valve to effect conjoint actuation thereof, a pressure fluid inlet to said one bore whereby a force may be applied to said first valve to urge it in one direction, a pressure fluid inlet to said other bore whereby a force may be applied to said second valve and transmitted to said first valve to urge said first valve in the opposite direction, and conduit means adapted to be connected between the pressure fluid supply to said one bore and said pressure chamber after the force applied to said second valve has moved said second valve a predetermined amount in said opposite direction to effect a snap action shift of said first valve in said opposite direction.

10. In a hydraulically operated control system, a control valve unit comprising a cylinder with a pair of spaced bores connected to a pressure chamber located therebetween, a first valve reciprocably mounted in one of said bores, said first valve having portions extending into said pressure chamber and into said other bore, resilient means normally positioning said first valve in said one bore, a second valve reciprocably mounted in said other bore, a third valve reciprocably mounted in said other bore and having portions engageable with said first and second valves, a pressure fluid inlet to said one bore providing means to urge said valves in one direction, a pressure fluid inlet to said other bore providing means to urge said valves in the opposite direction, and conduit means connected between the pressure fluid supply to said one bore and the pressure chamber, after a predetermined movement of said second valve in the said opposite direction, whereby pressure fluid may be applied to the portion of said first valve extending into said pressure chamber to thereby effect a snap action shift of said first valve in said opposite direction.

11. In a hydraulically operated control system, a valve unit comprising a cylinder with a pair of spaced bores and a pressure chamber connected to and located therebetween, a first valve reciprocably mounted in one of said bores, said first valve having portions extending into said pressure chamber and into said other bore, resilient means normally positioning said first valve in said one bore, a second valve reciprocably mounted in said other bore, a third valve telescopically arranged within said second valve and reciprocably mounted in said other bore and having portions engageable with said first and second valves, a pressure fluid inlet to said one bore providing means to urge said valves in one direction, a pressure fluid inlet to said other bore providing means to urge said valves in the opposite direction, conduit means connected between the pressure fluid supply to said one bore and the pressure chamber, after a predetermined movement of said second valve in the said opposite direction, whereby pressure fluid may be applied to the portion of said first valve extending into said pressure chamber to thereby effect a snap action shift of said first valve in said opposite direction, and conduit means connected between said pressure fluid supply to said one bore and the bore receiving said third valve, after a predetermined movement of said second valve in said opposite direction, whereby pressure fluid may be applied to said third valve to effect relative movement between said second and third valves to increase the effective length of said third valve.

12. In a hydraulically operated control system, a valve unit comprising a cylinder bore with a pressure chamber intermediate the ends providing axially spaced, connected valve receiving chambers at opposite ends of the bore, a pair of valves, one mounted in each end of said bore, having interconnected portions arranged for independent and conjoint movement, a first inlet to said bore arranged to apply pressure fluid to one of said valves so as to urge said valves in one direction, a second inlet to said bore arranged to apply pressure fluid to the other of said valves to urge said valves in the opposite direction, and conduit means adapted to be connected between the pressure fluid supply for said first inlet and the pressure chamber between the valve receiving chambers, after a predetermined movement of said other valve in said opposite direction, the pressure fluid admitted to said pressure chamber supplementing the pressure fluid applied to said other valve to effect snap action shift of said first valve in said opposite direction.

13. In a hydraulically operated control system a valve unit comprising a cylinder bore with a pressure chamber intermediate the ends thereof providing a pair of connected valve receiving chambers at opposite ends thereof, a pair of valves, one mounted in each end of said bore, having interconnected portions arranged for independent and conjoint movement therein, resilient means normally opposing movement of said valves, a first inlet to said bore arranged to apply pressure fluid to one of said valves so as to urge said valves in one direction, a second inlet to said bore arranged to apply pressure fluid to the other of said valves to urge said valves in the opposite direction, and conduit means adapted to be connected between the pressure fluid supply for said first inlet and the pressure chamber between the valve receiving chambers, after a predetermined movement of said other valve in said opposite direction, the pressure fluid admitted to said pressure chamber supplementing the pressure fluid applied to said other valve to effect snap action shift of said first valve in said opposite direction.

14. In a hydraulically operated control system, a governor adapted to be drivingly mounted on a rotatable member comprising a body portion formed with a pair of bores extending radially outward from diametrically opposed sides of said rotatable member, a plurality of telescopically arranged, relatively movable, weights movably mounted in one of said bores, a valve member movably mounted in the other bore, a tie shaft connecting one of said weights to said valve member, resilient means interconnecting said one weight to the other weights, means adapted to provide a seat for said other weights on said body portion after a predetermined radially outward movement of said other weights, a pressure fluid inlet to said other bore and a pressure fluid outlet from said other bore, the valve member in said other bore being arranged in said other bore and of such a shape as to provide an unbalanced area on which the pressure fluid admitted to said other bore acts to thereby urge said valve member radially outward in opposition to the centrifugal force of said weights transmitted to said valve by said shaft, radial movement of said valve member in said other bore controlling the pressure of the fluid admitted to and discharged from said other bore.

15. In a hydraulically operated control system for a transmission including a rotatable shaft and a source of pressure fluid, a governor comprising a body portion fixedly mounted on said shaft, said body portion having a pair of bores extending transversely to and substantially radially outwardly from said shaft and arranged at opposite sides thereof, a plurality of resiliently interconnected weights reciprocably mounted in one of said bores, means providing seats for certain of said weights on said body portion after a predetermined radial movement of said weights by centrifugal force due to shaft rotation, a valve reciprocably mounted in the other of said bores, tie means connecting another of said weights to said valve, a pressure fluid inlet to and a pressure fluid outlet from said other bore, movement of said valve in said other bore controlling the pressure of the fluid applied to said valve and passed through said other bore, said valve being arranged such that the pressure fluid admitted to said other bore will apply a force to said valve urging it radially outward whereby the force of the pressure fluid applied to said valve will be opposed by the centrifugal force applied to said weights.

16. In a hydraulically operated control system for a transmission including a rotatable shaft and a source of pressure fluid, a governor comprising a body portion fixedly mounted on said shaft, said body portion having a pair of bores extending transversely to said shaft and arranged at opposite sides thereof, a plurality of resiliently interconnected weights reciprocably mounted in one of said bores for relative radial movement, means providing seats for certain of said weights on said body portion after a predetermined amount of radial movement of the weights, a valve mounted in the other of said bores for radial movement, tie means connecting another of said weights to said valve, a pressure fluid inlet to and a pressure fluid outlet from said other bore, movement of said valve in said other bore controlling the pressure of the fluid applied to said valve and passed through said other bore, said valve having portions arranged such that the pressure fluid admitted to said other bore will apply a force to said valve urging it radially outward whereby the force of the pressure fluid applied to said valve will be opposed by the centrifugal force applied to said weights, and pressure relief means associated with said other bore to limit the pressure of the fluid passed through said other bore and to balance said valve in said other bore.

17. In a control system for a mechanism including a rotatable member and a source of pressure fluid, a governor mechanism comprising a plurality of resiliently interconnected weights mounted on said rotatable member so as to be urged radially outward under the influence of centrifugal force, means to seat certain of said weights after said rotatable member attains a certain speed, a valve member mounted in a cylinder carried by said rotatable member, said valve member having differential pressure areas and being arranged to be moved radially outward under the influence of centrifugal force, the movement of the valve member being in a direction opposite to that of said weights, a rigid member connecting other of said weights and said valve member, a pressure fluid inlet to said cylinder and a pressure fluid outlet from said cylinder, movement of said valve in said cylinder controlling the pressure of the fluid applied to said valve member and the pressure of the fluid passed through said cylinder, said valve member being arranged such that the pressure admitted to said cylinder applies a force to said valve member tending to urge it radially outward in opposition to the force applied to said valve member by said weights.

18. A governor mechanism adapted to be mounted on a rotatable member and connected to a source of pressure fluid comprising a pair of resiliently interconnected radially movable weights, means arranged to provide a seat for one of said weights after a predetermined relative movement between said weights, a valve cylinder with a pressure fluid inlet thereto and a pressure fluid outlet therefrom, a valve reciprocably mounted in said cylinder and arranged to control the passage of pressure fluid through said cylinder, and rigid means connecting the valve to the other of said weights, said valve being arranged in said cylinder so that pressure fluid admitted to said cylinder exerts a force on said valve tending to move the valve in a direction that will be opposed by the centrifugal force of said weights when said rotatable member is rotating.

19. A governor mechanism adapted to be mounted on a rotatable member and connected to a source of pressure fluid comprising a pair of resiliently interconnected, radially movable, weights, means arranged to provide a seat for one of said weights after a predetermined relative radial movement between said weights, a valve cylinder with pressure fluid inlet thereto and a pressure fluid outlet therefrom, a valve reciprocably mounted in said cylinder and arranged to control the passage of pressure fluid through said cylinder, and rigid means connecting the valve to the other of said weights, said valve being arranged in said cylinder so that pressure fluid admitted to said cylinder exerts a force on said valve tending to move the valve in a direction that will be opposed by the centrifugal force of said weights when said rotatable member is rotating, said valve including pressure applying portions of varying areas which provide a differential area on which the pressure fluid in the cylinder may react to effect radially outward movement of the valve in said cylinder.

20. In a pressure fluid operated transmission control system, a governor mechanism adapted to be mounted on a rotatable member and to be connected to a source of pressure fluid comprising a body portion having a pair of opposed bores therein arranged to extend radially outward from opposite sides of the rotatable member on which the governor mechanism is to be mounted, a pair of concentrically arranged, relatively movable weights mounted in one of said bores for movement axially thereof, said weights being interconnected by a resilient means that opposes relative movement between the weights in one axially extending direction, means in said one bore providing a seat for one of said weights on said body portion, a shaft connected to said other weight having portions extending into said other bore, a valve mounted in said other bore and connected to said shaft, said valve having spaced, annular, lands of differing diameters, a pressure fluid inlet to said other bore arranged to be controlled by movement of said valve and to admit pressure fluid to the portion of said other bore located between said lands, a pressure fluid outlet from the portion of said other bore located between said valve lands, and a pressure relief means for said other bore.

21. A governor mechanism adapted to be mounted on a rotatable member and connected to a pressure fluid supply source comprising a body portion having a radially extending valve bore therein of T-shaped cross-sectional configuration, a double-land piston valve mounted for reciprocation in said bore, said valve having a relatively small land fitting the stem portion of the bore and a relatively large land fitting the head portion of the bore, a pressure fluid inlet to the stem of the bore, a pressure fluid outlet from the head of the bore, a shaft connected to said valve, a first weight anchored to said shaft, a second weight connected to said first weight by resilient means permitting relative movement between said weights and a support adapted to provide a seat for said second weight after a predetermined relative radial movement between said weights.

22. In a pressure fluid operated control system for a driver operated transmission, a driver operated torque responsive control valve unit comprising a valve body with a cylinder bore therein having open and closed ends, a first driver operated valve reciprocably mounted in the open end of said cylinder bore, a second valve reciprocably mounted in the opposite closed end of said cylinder bore, resilient means interconnecting the interiorly opposed portions of said first and second valves, a cylinder cup located within said opposite closed end of said cylinder bore and reciprocably mounted on an end of said second valve, conduit means arranged to apply pressure fluid to the closed end of said bore and conduit means to transmit pressure fluid from said bore to the interior of said cylinder cup to urge said second valve in one direction and driver operated means arranged to shift said valves in the opposite direction.

23. In a pressure fluid operated control system for a driver operated transmission, a driver operable torque responsive control valve unit comprising a valve body with a cylinder bore therein having an open and a closed end, a first valve reciprocably mounted in the open end of said cylinder bore, a second valve reciprocably mounted in the opposite closed end of said cylinder bore, resilient means interconnecting the interiorly opposed portions of said first and second valves, a cylinder cup located within said opposite closed end of said cylinder bore and reciprocably mounted on an end of said second valve, conduit means arranged to apply pressure fluid to the interior of said cylinder cup to urge said second valve in one direction, driver operated means arranged to shift said valves in the opposite direction, conduit means arranged to pass pressure fluid to the closed end of said bore and conduit means to transmit pressure fluid to the interior of said cup, and a pressure relief valve controllable by operation of said first valve to drain pressure fluid from said closed end of the cylinder bore.

24. In a pressure fluid operated control system for a driver operated transmission, a driver operable torque responsive control valve unit comprising a valve body with a cylinder bore therein having an open and a closed end, a first valve reciprocably mounted in the open end of said cylinder, a second valve reciprocably mounted in the opposite closed end of said cylinder, resilient means interconnecting the interiorly opposed portions of said first and second valves, a cylinder cup located within said opposite closed end of said cylinder and reciprocably mounted on an end of said second valve, conduit means arranged to apply pressure fluid to the closed end of said cylinder bore, conduit means to apply pressure fluid to the interior of said cylinder cup to urge said second valve in one direction, manually operated means arranged to shift said valves in the opposite direction, conduit means arranged to pass pressure fluid from said closed to said open end of said cylinder bore, and a pressure relief valve controllable by driver operation of said first valve to drain pressure fluid from said last mentioned conduit means, and a by-pass bleed port in said last mentioned conduit means arranged to provide means for by-passing a portion of the pressure fluid around said first valve.

25. In a pressure fluid operated control system for a change speed transmission, a manually operated speed ratio selector valve unit comprising a valve body with a bore therethrough, a piston valve mounted in said bore for axial movement relative thereto, an operator for said piston valve connected to said piston valve by resilient means, a sleeve valve mounted in said bore for axial movement relative thereto and arranged concentrically about a portion of said piston valve, said sleeve valve and said piston valve including interengageable means that limit the relative movement between said valves in one axial direction, and means arranged to apply pressure fluid to portions of said sleeve valve to urge said sleeve valve in the opposite axial direction.

26. In a pressure fluid operated control system for a change speed transmission, a manually operated speed ratio selector valve unit comprising a valve body with a bore therethrough, a piston valve mounted in said bore for axial movement relative thereto, an operator for said piston valve connected to said piston valve by resilient means, a sleeve valve mounted in said bore for axial movement relative thereto and arranged concentrically about a portion of said piston valve, said sleeve valve and said piston valve including interengageable means that limit the relative movement between said valves in one axial direction, and means arranged to apply pressure fluid to portions of said sleeve valve to urge said sleeve valve in the opposite axial direction and resilient means normally urging said sleeve valve in said opposite axial direction.

27. In combination an engine, an engine driven shaft, an accelerator pedal throttle control for the engine, a change speed transmission unit of the planetary gear type drivingly connected to said engine driven shaft, said transmission unit comprising input and output shafts having a plurality of planetary gear trains selectively connectible therebetween to provide for the transmission of a plurality of different speed ratio drives between said shafts, fluid pressure operated servo mechanisms for controlling activation and de-activation of said planetary gear trains, and a fluid pressure operated control system for said servo mechanisms comprising an engine driven pressure fluid supply source having conduit means connecting said supply source to said servo mechanisms, an output shaft speed responsive governor connected to said fluid pressure supply source arranged to provide a source of governor pressure proportional to the speed of the output shaft, a driver controlled manually operable speed ratio selector valve connected by conduit means to said fluid pressure supply source and to said servo mechanisms to provide for driver selection of a starting speed ratio drive, an accelerator pedal operated pressure regulating valve unit connected by conduit means to said fluid pressure supply source adapted to provide a source of torque pressure substantially proportional to the torque load of said output shaft, an automatically operable speed ratio control valve unit to effect automatic upshifts from and downshifts to said starting speed ratio drive with variations in the differential pressure relationship existing between said governor pressure and said torque pressure comprising a valve cylinder with a bore therein having a shift valve slidable in said bore, conduit means to apply said torque pressure to a portion of said shift valve to urge said shift valve in one direction, conduit means to apply said governor pressure to other portions of said shift valve to urge said shift valve in the opposite direction, pressure fluid supply means controlled by the movement of said shift valve connected to the conduit means connecting said fluid pressure supply source to said servo mechanisms to provide means to automatically control operation of said servo mechanisms, said automatically operable speed ratio control valve unit including additional valve means actuable after a predetermined movement of said shift valve to apply torque pressure to the portions of the shift valve normally acted upon by said governor pressure so as to provide a means for effecting a snap-action shift of said shift valve.

28. The combination set forth in claim 27 including accelerator pedal operated valve means to vary the differential pressure relationship applied to said shift valve to provide a means for overruling the automatic operation of said shift valve.

29. The combination set forth in claim 27 including conduit means applying governor pressure to said speed ratio selector valve adapted to restrain certain manual shifts of said speed ratio selector valve at or above predetermined output shaft speeds.

30. The combination set forth in claim 27 including an output shaft driven pressure fluid supply source arranged in parallel with said engine driven pressure fluid supply source.

31. A pressure fluid operated control system for a change speed transmission including pressure fluid operated means for controlling the speed ratio drives transmittable by said transmission comprising pump means providing a pressure fluid supply source, a first manually controlled valve unit connected to said pressure fluid source and said fluid operated means adapted to select a speed ratio drive, a foot operated pressure regulating valve unit connected to said pressure fluid source adapted to convert pump pressure fluid to a source of torque responsive pressure fluid directly proportional to the torque load applied to said transmission, a pressure regulating governor valve unit connected to said pressure fluid source adapted to convert pump pressure fluid to a source of speed responsive pressure fluid directly proportional to the output speed of said transmission, and a third valve unit connecting said pump pressure fluid supply source to said fluid operated means and having opposed portions of the valve thereof connected to said torque and to said speed responsive pressure fluid supply sources, said third valve unit being arranged to automatically effect changes in the speed ratio drive transmitted by said transmission in response to variation in the differential pressure relationship concurrently existing between the speed responsive pressure fluid and the torque responsive pressure fluid, said third valve unit including pressure fluid operated piston means to vary the existing differential pressure relationship to effect snap action change in the speed ratio drive when the concurrently existing differential pressure relationship between the torque and speed responsive pressure fluids has attained a predetermined condition.

32. A pressure fluid operated control system for a change speed transmission including pressure fluid operated means for controlling the speed ratio drives transmittable by said transmission comprising pump means providing pressure fluid supply source, a first manually controlled valve unit to select a starting speed ratio drive, a second foot operated, pressure regulating, valve unit connected to said pressure fluid supply source adapted to convert pump pressure fluid to a source of torque responsive pressure fluid directly proportional to the torque load applied to said transmission, a pressure regulating governor valve unit connected to said pressure fluid supply source adapted to convert pump pressure fluid to a source of speed responsive pressure fluid directly proportional to the output speed of said transmission, and a third valve unit connecting said pressure fluid supply source to said fluid operated means and having opposed portions of the valve connected to said torque and to said speed responsive pressure fluid supply sources arranged to automatically effect changes in the speed ratio drive transmitted by said transmission in response to variation in the differential pressure relationship concurrently existing between the speed responsive pressure fluid and the torque responsive pressure fluid, said second foot operated valve unit including foot actuated pressure fluid operated means to overrule the automatic operation of said third valve unit to thereby provide for effecting change in speed ratio drive at the will of the transmission operator.

33. In a pressure fluid operated control system for a driver operated change speed transmission, a source of torque responsive pressure fluid and a source of speed responsive pressure fluid, a torque and speed responsive valve, means adapted to apply the torque responsive and the speed responsive pressure fluid to opposed portions of said torque and speed responsive control valve to effect automatic actuation thereof by the differential pressure relationship applied to said valve, a driver operated torque responsive valve, and pressure fluid conduit means connecting said torque responsive valve to each of said opposed portions of said control valve and by-pass means whereby driver operation of said torque responsive valve to a predetermined position will bleed torque responsive pressure from a portion of said control valve and provide means to overrule the automatic operation of said torque and speed responsive control valve, said by-pass means including a relief valve arranged to be activated by operation of said torque responsive valve to said predetermined position so as to reduce the effect of the torque responsive pressure fluid applied to the torque and speed responsive control valve.

34. In a pressure fluid operated control system for a driver operated change speed transmission, a source of torque responsive pressure fluid and a source of speed responsive pressure fluid, a torque and speed responsive control valve, means adapted to apply the torque responsive and the speed responsive pressure fluid to opposed portions of said torque and speed responsive control valve to effect automatic actuation thereof by the differential pressure relationship applied to said valve, a driver operated torque responsive valve, and pressure fluid conduit means for connecting the source of torque responsive pressure fluid to said opposed portions of said control valve, a by-pass whereby driver operation of said torque responsive valve to a predetermined position will bleed torque pressure from one portion of said control valve and overrule the automatic operation of said torque and speed responsive control valve, the said by-pass means including a relief valve adapted to be activated by operation of said torque responsive valve to said predetermined position to reduce the effect of the torque responsive pressure fluid applied to the torque and speed responsive control valve and a pressure fluid bleed port associated with said by-pass arranged to permit draining of a portion of the torque responsive pressure fluid from said torque and speed responsive control valve while retarding reduction in the pressure of the torque responsive pressure fluid applied to other portions of said torque and speed responsive control valve.

35. In a pressure fluid operated control system for a driver operated mechanism, a source of torque responsive pressure fluid and a source of speed responsive pressure fluid, an automatic control valve unit including a shift valve arranged to have the torque and the speed responsive pressure fluids applied respectively to opposite ends thereof to effect automatic operation of said shift valve by the differential pressure relationship applied to the valve, a driver operated torque responsive valve, conduit means connected between said torque responsive valve and the speed responsive pressure fluid operated end of said shift valve to provide for the application of torque responsive pressure fluid to opposite ends of said shift valve after a predetermined shift of said shift valve by the said differential pressure relationship, a relief valve associated with said conduit means and arranged to be activated after a predetermined opening of said torque responsive valve so as to provide means for the driver to overrule automatic operation of said shift valve whereupon the torque responsive pressure fluid applied to the normally speed responsive pressure fluid operated end of said shift valve is vented from that end of the shift valve.

36. In a pressure fluid operated control system for a driver operated power transmission, a source of torque responsive pressure fluid and a source of speed responsive pressure fluid, an automatic control valve unit including a shift valve arranged to have the torque and the speed responsive pressure fluids applied respectively to opposite ends thereof to effect automatic operation of said shift valve by the differential pressure relationship applied to said valve, a driver operated torque responsive valve, conduit means connected between said torque responsive valve and the speed responsive pressure fluid operated end of said shift valve to provide for the application of torque responsive pressure fluid to opposite ends of said shift valve after a predetermined shift of said control valve by the speed responsive pressure fluid, a relief valve associated with said conduit means and arranged so as to provide means for the driver to overrule automatic operation of said shift valve after a predetermined opening of the torque responsive valve whereupon the torque responsive pressure fluid applied to the speed responsive pressure fluid operated end of said shift valve is vented from that end of the shift valve, and a pressure fluid bleed port connected between said torque responsive pressure fluid operated end of said shift valve and said relief valve.

37. In a hydraulically operated control system, a governor adapted to be drivingly connected to a rotatable member comprising a body portion formed with a valve bore extending longitudinally thereof, a plurality of relatively movable weights each movably mounted on said body portion so as to be actuated by centrifugal force on rotation of the body portion, a valve member mounted in the valve bore for movement therealong, means connecting one of said weights to said valve member to transmit the movement of said one of said weights to said valve member, resilient means interconnecting said one weight to another of said weights, means adapted to provide a seat for the other of said weights on said body portion after a predetermined movement of the other weight by centrifugal force on rotation of said body portion, a pressure fluid inlet to said valve bore and a pressure fluid outlet from said valve bore, the valve member in said valve bore being formed to provide an unbalanced area on which the pressure fluid admitted to said valve bore acts to thereby urge said valve member longitudinally of said bore in opposition to the force applied to said valve member by the centrifugal force of said weights on rotation of the body portion, movement of said valve member in said valve bore controlling the pressure of the fluid admitted to and discharged from said bore.

38. In a hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, a first automatically controlled, differential pressure operated, valve unit connected to said first conduit means between the line pressure supply source and the said control mechanisms, a source of pressure fluid having a pressure responsive to the speed of the motor vehicle, a second conduit means connecting said source of vehicle speed responsive pressure fluid to a first portion of said first differential pressure operated valve, an operator operable throttle valve for controlling the torque transmitted by the motor vehicle engine, a source of pressure fluid controlled by the movement of said throttle valve providing a source of pressure fluid having a pressure responsive to the degree of opening of the engine throttle valve, a third conduit means connecting the source of throttle valve responsive pressure fluid to a second portion of the first differential pressure operated valve whereby the vehicle speed responsive pressure fluid and the pressure fluid responsive to the degree of throttle valve opening act upon the first differential pressure operated valve in opposed relationship and cooperatively control the passage of line pressure to said control mechanisms, and means activated by a predetermined movement of said first differential pressure operated valve whereby the pressure fluid responsive to the degree of throttle valve opening that is applied to said first differential pressure operated valve is arranged to coact with the vehicle speed responsive pressure fluid applied to said first differential pressure operated valve to effect rapid shift thereof.

References Cited in the file of this patent

UNITED STATES PATENTS

| Number | Name | Date |
|---|---|---|
| 1,329,385 | Egger | Feb. 3, 1920 |
| 1,548,666 | Dickinson | Aug. 4, 1925 |
| 1,662,104 | Dickinson | Mar. 13, 1928 |
| 2,102,781 | Bieretz | Dec. 21, 1937 |
| 2,193,305 | Thompson | Mar. 12, 1940 |
| 2,204,872 | Thompson | June 18, 1940 |
| 2,221,393 | Carnegie | Nov. 12, 1940 |
| 2,229,345 | Schotz | Jan. 21, 1941 |
| 2,282,949 | Dolza | May 12, 1942 |
| 2,332,593 | Nutt et al. | Oct. 26, 1943 |
| 2,343,955 | Cotterman | Mar. 14, 1944 |
| 2,372,817 | Dodge | Apr. 3, 1945 |
| 2,516,203 | Greenlee et al. | July 25, 1950 |
| 2,603,943 | Evernden | July 22, 1952 |